US010200306B2

(12) United States Patent
Nhu et al.

(10) Patent No.: US 10,200,306 B2
(45) Date of Patent: Feb. 5, 2019

(54) VISUALIZATION OF PACKET TRACING OPERATION RESULTS

(71) Applicant: NICIRA, INC., Palo Alto, CA (US)

(72) Inventors: Alexander Nhu, Palo Alto, CA (US); Brighton Vino Jegarajan, Palo Alto, CA (US); Jian Shen Sik, Palo Alto, CA (US); Venkata Ranganath Babu Golla, Pune (IN); Shivraj Shahajirao Sonawane, Pune (IN)

(73) Assignee: NICIRA, INC., Palo Alto, CA (US)

( * ) Notice: Subject to any disclaimer, the term of this patent is extended or adjusted under 35 U.S.C. 154(b) by 25 days.

(21) Appl. No.: 15/588,746

(22) Filed: May 8, 2017

(65) Prior Publication Data

US 2018/0262447 A1 Sep. 13, 2018

(30) Foreign Application Priority Data

Mar. 7, 2017 (IN) .............................. 201741007938

(51) Int. Cl.
*H04L 12/931* (2013.01)
*H04L 12/939* (2013.01)
(Continued)

(52) U.S. Cl.
CPC .............. *H04L 49/20* (2013.01); *H04L 43/10* (2013.01); *H04L 47/32* (2013.01); *H04L 49/555* (2013.01); *H04L 69/323* (2013.01)

(58) Field of Classification Search
CPC ....... H04L 49/20; H04L 49/555; H04L 43/10; H04L 47/32; H04L 69/323
See application file for complete search history.

(56) References Cited

U.S. PATENT DOCUMENTS 5,224,100 A 6/1993 Lee et al.
5,245,609 A 9/1993 Ofek et al.
(Continued)

FOREIGN PATENT DOCUMENTS

EP 1154601 A1 11/2001
JP 2002141905 A 5/2002
(Continued)

OTHER PUBLICATIONS

Non-Published commonly Owned U.S. Appl. No. 15/726,789, filed Oct. 6, 2017, 32 pages, Nicira Inc.
(Continued)

*Primary Examiner* — Afsar M Qureshi
(74) *Attorney, Agent, or Firm* — Adeli LLP

(57) ABSTRACT

Some embodiments provide a method that receives a request for information regarding a path between endpoints of a logical network. The method provides, for display, a visualization of the path including (i) a set of logical network components between the endpoints and (ii) a set of physical network components that implement the logical network components. The physical network components and the logical network components are aligned in the display. In some embodiments, the method receives data regarding a packet tracing operation between the endpoints. The method generates a display including (i) a visualization of the path between the endpoints of the logical network and (ii) a representation of the received data regarding the packet tracing operation, with the packet tracing operation data is visually linked to the components of the path.

22 Claims, 15 Drawing Sheets

(51) Int. Cl.
  *H04L 12/823* (2013.01)
  *H04L 12/26* (2006.01)
  *H04L 29/08* (2006.01)

(56) References Cited

U.S. PATENT DOCUMENTS

| | | | |
|---|---|---|---|
| 5,265,092 A | 11/1993 | Soloway et al. |
| 5,504,921 A | 4/1996 | Dev et al. |
| 5,550,816 A | 8/1996 | Hardwick et al. |
| 5,729,685 A | 3/1998 | Chatwani et al. |
| 5,751,967 A | 5/1998 | Raab et al. |
| 5,781,534 A | 7/1998 | Perlman et al. |
| 6,104,699 A | 8/2000 | Holender et al. |
| 6,104,700 A | 8/2000 | Haddock et al. |
| 6,141,738 A | 10/2000 | Munter et al. |
| 6,219,699 B1 | 4/2001 | McCloghrie et al. |
| 6,430,160 B1 | 8/2002 | Smith et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,658,002 B1 | 12/2003 | Ross et al. |
| 6,680,934 B1 | 1/2004 | Cain |
| 6,721,334 B1 | 4/2004 | Ketcham |
| 6,785,843 B1 | 8/2004 | McRae et al. |
| 6,941,487 B1 | 9/2005 | Balakrishnan et al. |
| 6,963,585 B1 | 11/2005 | Le Pennec et al. |
| 6,999,454 B1 | 2/2006 | Crump |
| 7,013,342 B2 | 3/2006 | Riddle |
| 7,062,559 B2 | 6/2006 | Yoshimura et al. |
| 7,079,544 B2 | 7/2006 | Wakayama et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,243,143 B1 | 7/2007 | Bullard |
| 7,283,473 B2 | 10/2007 | Arndt et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,370 B1 | 1/2009 | Dayal et al. |
| 7,555,002 B2 | 6/2009 | Arndt et al. |
| 7,577,131 B2 | 8/2009 | Joseph et al. |
| 7,590,133 B2 | 9/2009 | Hatae et al. |
| 7,602,723 B2 | 10/2009 | Mandato et al. |
| 7,606,260 B2 | 10/2009 | Oguchi et al. |
| 7,627,692 B2 | 12/2009 | Pessi |
| 7,633,955 B1 | 12/2009 | Saraiya et al. |
| 7,639,625 B2 | 12/2009 | Kaminsky et al. |
| 7,643,488 B2 | 1/2010 | Khanna et al. |
| 7,649,851 B2 | 1/2010 | Takashige et al. |
| 7,706,266 B2 | 4/2010 | Plamondon |
| 7,710,874 B2 | 5/2010 | Balakrishnan et al. |
| 7,760,735 B1 | 7/2010 | Chen et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,808,919 B2 | 10/2010 | Nadeau et al. |
| 7,808,929 B2 | 10/2010 | Wong et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,937,492 B1 | 5/2011 | Kompella et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,024,478 B2 | 9/2011 | Patel |
| 8,027,354 B1 | 9/2011 | Portolani et al. |
| 8,031,606 B2 | 10/2011 | Memon et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,161,270 B1 | 4/2012 | Parker et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,254,273 B2 | 8/2012 | Kaminsky et al. |
| 8,265,062 B2 | 9/2012 | Tang et al. |
| 8,265,075 B2 | 9/2012 | Pandey |
| 8,281,067 B2 | 10/2012 | Stolowitz |
| 8,290,137 B2 | 10/2012 | Yurchenko et al. |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,558 B2 | 1/2013 | Nicholson et al. |
| 8,351,418 B2 | 1/2013 | Zhao et al. |
| 8,359,576 B2 | 1/2013 | Prasad et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,571,031 B2 | 10/2013 | Davies et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,644,188 B1 | 2/2014 | Brandwine et al. |
| 8,645,952 B2 | 2/2014 | Biswas et al. |
| 8,750,288 B2 | 6/2014 | Nakil et al. |
| 8,762,501 B2 | 6/2014 | Kempf et al. |
| 8,806,005 B2 | 8/2014 | Miri et al. |
| 8,837,300 B2 | 9/2014 | Nedeltchev et al. |
| 8,838,743 B2 | 9/2014 | Lewites et al. |
| 9,059,926 B2 | 6/2015 | Akhter et al. |
| 9,197,529 B2 | 11/2015 | Ganichev et al. |
| 9,226,220 B2 | 12/2015 | Banks et al. |
| 9,280,448 B2 | 3/2016 | Farrell et al. |
| 9,282,019 B2 | 3/2016 | Ganichev et al. |
| 9,344,349 B2 | 5/2016 | Ganichev et al. |
| 9,407,580 B2 | 8/2016 | Ganichev et al. |
| 9,602,334 B2 | 3/2017 | Benny |
| 9,898,317 B2 | 2/2018 | Nakil et al. |
| 10,044,581 B1* | 8/2018 | Russell .................. H04L 43/08 |
| 2001/0020266 A1 | 9/2001 | Kojima et al. |
| 2001/0043614 A1 | 11/2001 | Viswanadham et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2004/0073659 A1 | 4/2004 | Rajsic et al. |
| 2004/0098505 A1 | 5/2004 | Clemmensen |
| 2004/0186914 A1 | 9/2004 | Shimada |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0111445 A1 | 5/2005 | Wybenga et al. |
| 2005/0120160 A1 | 6/2005 | Plouffe et al. |
| 2005/0132044 A1 | 6/2005 | Guingo et al. |
| 2005/0182853 A1 | 8/2005 | Lewites et al. |
| 2005/0220096 A1 | 10/2005 | Friskney et al. |
| 2005/0232230 A1 | 10/2005 | Nagami et al. |
| 2006/0002370 A1 | 1/2006 | Rabie et al. |
| 2006/0026225 A1 | 2/2006 | Canali et al. |
| 2006/0028999 A1 | 2/2006 | Iakobashvili et al. |
| 2006/0029056 A1 | 2/2006 | Perera et al. |
| 2006/0037075 A1 | 2/2006 | Frattura et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0206655 A1 | 9/2006 | Chappell et al. |

(56) References Cited

U.S. PATENT DOCUMENTS

| | | |
|---|---|---|
| 2006/0218447 A1* | 9/2006 | Garcia ............... H04L 43/087 714/39 |
| 2006/0221961 A1 | 10/2006 | Basso et al. |
| 2006/0282895 A1 | 12/2006 | Rentzis et al. |
| 2006/0291388 A1 | 12/2006 | Amdahl et al. |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0097982 A1* | 5/2007 | Wen ................... H04L 1/1841 370/394 |
| 2007/0156919 A1 | 7/2007 | Potti et al. |
| 2007/0260721 A1 | 11/2007 | Bose et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0049614 A1 | 2/2008 | Briscoe et al. |
| 2008/0049621 A1 | 2/2008 | McGuire et al. |
| 2008/0049786 A1 | 2/2008 | Ram et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0112551 A1 | 5/2008 | Forbes et al. |
| 2008/0159301 A1 | 7/2008 | De Heer |
| 2008/0240095 A1 | 10/2008 | Basturk |
| 2009/0010254 A1 | 1/2009 | Shimada |
| 2009/0100298 A1 | 4/2009 | Lange et al. |
| 2009/0109973 A1 | 4/2009 | Ilnicki |
| 2009/0150527 A1 | 6/2009 | Tripathi et al. |
| 2009/0292858 A1 | 11/2009 | Lambeth et al. |
| 2010/0128623 A1 | 5/2010 | Dunn et al. |
| 2010/0131636 A1 | 5/2010 | Suri et al. |
| 2010/0214949 A1 | 8/2010 | Smith et al. |
| 2010/0232435 A1 | 9/2010 | Jabr et al. |
| 2010/0254385 A1 | 10/2010 | Sharma et al. |
| 2010/0275199 A1 | 10/2010 | Smith et al. |
| 2010/0306408 A1 | 12/2010 | Greenberg et al. |
| 2011/0022695 A1 | 1/2011 | Dalal et al. |
| 2011/0075664 A1 | 3/2011 | Lambeth et al. |
| 2011/0085557 A1 | 4/2011 | Gnanasekaran et al. |
| 2011/0085559 A1 | 4/2011 | Chung et al. |
| 2011/0085563 A1 | 4/2011 | Kotha et al. |
| 2011/0128959 A1 | 6/2011 | Bando et al. |
| 2011/0137602 A1 | 6/2011 | Desineni et al. |
| 2011/0194567 A1 | 8/2011 | Shen |
| 2011/0202920 A1 | 8/2011 | Takase |
| 2011/0261825 A1 | 10/2011 | Ichino |
| 2011/0299413 A1 | 12/2011 | Chatwani et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0317559 A1 | 12/2011 | Kern et al. |
| 2011/0317696 A1 | 12/2011 | Aldrin et al. |
| 2012/0079478 A1 | 3/2012 | Galles et al. |
| 2012/0159454 A1 | 6/2012 | Barham et al. |
| 2012/0182992 A1 | 7/2012 | Cowart et al. |
| 2012/0287791 A1 | 11/2012 | Xi et al. |
| 2013/0024579 A1 | 1/2013 | Zhang et al. |
| 2013/0031233 A1 | 1/2013 | Feng et al. |
| 2013/0041934 A1 | 2/2013 | Annamalaisami et al. |
| 2013/0044636 A1 | 2/2013 | Koponen et al. |
| 2013/0054761 A1 | 2/2013 | Kempf et al. |
| 2013/0058346 A1 | 3/2013 | Sridharan et al. |
| 2013/0067067 A1 | 3/2013 | Miri et al. |
| 2013/0125120 A1 | 5/2013 | Zhang et al. |
| 2013/0163427 A1 | 6/2013 | Beliveau et al. |
| 2013/0163475 A1 | 6/2013 | Beliveau et al. |
| 2013/0332602 A1 | 12/2013 | Nakil et al. |
| 2013/0332983 A1 | 12/2013 | Koorevaar et al. |
| 2013/0339544 A1 | 12/2013 | Mithyantha |
| 2014/0019639 A1 | 1/2014 | Ueno |
| 2014/0029451 A1 | 1/2014 | Nguyen |
| 2014/0115578 A1 | 4/2014 | Cooper et al. |
| 2014/0119203 A1 | 5/2014 | Sundaram et al. |
| 2014/0126418 A1 | 5/2014 | Brendel et al. |
| 2014/0157405 A1 | 6/2014 | Joll et al. |
| 2014/0177633 A1 | 6/2014 | Manula et al. |
| 2014/0195666 A1 | 7/2014 | Dumitriu et al. |
| 2014/0207926 A1 | 7/2014 | Benny |
| 2014/0281030 A1* | 9/2014 | Cui ...................... H04L 43/026 709/244 |
| 2014/0282823 A1 | 9/2014 | Rash et al. |
| 2014/0304393 A1 | 10/2014 | Annamalaisami et al. |
| 2015/0016286 A1* | 1/2015 | Ganichev ........... H04L 12/4633 370/252 |
| 2015/0016469 A1 | 1/2015 | Ganichev et al. |
| 2015/0180755 A1* | 6/2015 | Zhang ................. H04L 43/0858 370/244 |
| 2015/0281036 A1* | 10/2015 | Sun ..................... H04L 43/0829 370/248 |
| 2016/0105333 A1 | 4/2016 | Lenglet et al. |
| 2016/0149791 A1 | 5/2016 | Ganichev et al. |
| 2016/0226741 A1 | 8/2016 | Ganichev et al. |
| 2017/0358111 A1 | 12/2017 | Madsen |
| 2018/0102959 A1 | 4/2018 | Ganichev et al. |

FOREIGN PATENT DOCUMENTS

| | | |
|---|---|---|
| JP | 2003069609 A | 3/2003 |
| JP | 2003124976 A | 4/2003 |
| JP | 2003318949 A | 11/2003 |
| WO | 9506989 A1 | 3/1995 |
| WO | 2012126488 A1 | 9/2012 |
| WO | 2013184846 A1 | 12/2013 |

OTHER PUBLICATIONS

Anwer, Muhammad Bilal, et al., "Building a Fast, Virtualized Data Plane with Programmable Hardware," Aug. 17, 2009, 8 pages, VISA'09, ACM Barcelona, Spain.

Author Unknown, "Open vSwitch, An Open Virtual Switch," Dec. 30, 2010, 2 pages, Cisco Systems, Inc.

Author Unknown, "OpenFlow Switch Specification, Version 0.9.0 (Wire Protocol 0x98)," Jul. 20, 2009, 36 pages, Open Networking Foundation.

Author Unknown, "OpenFlow Switch Specification, Version 1.0.0 (Wire Protocol 0x01)," Dec. 31, 2009, 42 pages, Open Networking Foundation.

Author Unknown, "OpenFlow Switch Specification, Version 1.1.0 Implemented (Wire Protoco 0x02)," Feb. 28, 2011, 56 pages, Open Networking Foundation.

Casado, Martin, et al., "Ethane: Taking Control of the Enterprise," SIGCOMM'07, Aug. 27-31, 2007, 12 pages, ACM, Kyoto, Japan.

Curtis, Andrew R., et al., "DevoFlow: Scaling Flow Management for High-Performance Networks," Aug. 15, 2011, 12 pages, SIGCOMM, ACM.

Das, Saurav, et al., "Simple Unified Control for Packet and Circuit Networks," Month Unknown, 2009, 2 pages, IEEE.

Das, Saurav, et al., "Unifying Packet and Circuit Switched Networks with OpenFlow," Dec. 7, 2009, 10 pages.

Fernandes, Natalia C., et al., "Virtual networks:isolation, performance, and trends," Oct. 7, 2010, 17 pages, Institut Telecom and Springer-Verlag.

Foster, Nate, et al., "Frenetic: A Network Programming Language," ICFP '11, Sep. 19-21, 2011, 13 pages, Tokyo, Japan.

Greenhalgh, Adam, et al., "Flow Processing and the Rise of Commodity Network Hardware," ACM SIGCOMM Computer Communication Review, Apr. 2009, 6 pages, vol. 39, No. 2.

Gude, Natasha, et al., "NOX: Towards an Operating System for Networks," Jul. 2008, 6 pages, vol. 38, No. 3, ACM SIGCOMM Computer communication Review.

Hinrichs, Timothy L., et al., "Practical Declarative Network Management," WREN'09, Aug. 21, 2009, 10 pages, Barcelona, Spain.

Koponen, Teemu, et al., "Network Virtualization in Multi-tenant Datacenters," Aug. 2013, 22 pages, VMware, Inc., Palo Alto, California, USA.

Koponen, Teemu, et al., "Onix: A Distributed Control Platform for Large-scale Production Networks," In Proc. OSDI, Oct. 2010, 14 pages.

(56) References Cited

OTHER PUBLICATIONS

Loo, Boon Thau, et al., "Declarative Routing: Extensible Routing with Declarative Queries," In Proc. of SIGCOMM, Aug. 21-26, 2005, 12 pages, Philadelphia, PA, USA.

Loo, Boon Thau, et al., "Implementing Declarative Overlays," In Proc. of SOSP, Oct. 2005,16 pages. Brighton, United Kingdom.

Matsumoto, Nobutaka, et al., "LightFlow: Speeding Up GPU-based Flow Switching and Facilitating Maintenance of Flow Table," 2012 IEEE 13th International Conference on High Performance Switching and Routing, Jun. 24, 2012, 6 pages, IEEE.

McKeown, Nick, et al., "OpenFlow: Enabling Innovation in Campus Networks," ACS SIGCOMM Computer communication Review, Apr. 2008, 6 pages, vol. 38, No. 2.

Pettit, Justin, et al., "Virtual Switching in an Era of Advanced Edges," Sep. 2010, 7 pages.

Pfaff, Ben, et al., "The Open vSwitch Database Management Protocol," draft-pfaff-ovsdb-proto-00, Aug. 20, 2012, 34 pages, Nicira, Inc., Palo Alto, California, USA.

Pfaff, Ben, et al., "OpenFlow Switch Specification," Sep. 6, 2012, 128 pages, The Open Networking Foundation.

Pfaff, Ben., et al., "Extending Networking into the Virtualization Layer," Proc. of HotNets, Oct. 2009, 6 pages.

Phaal, Peter, et al., "sFlow Version 5," Jul. 2004, 46 pages, sFlow.org.

Phan, Doantam, et al., "Visual Analysis of Network Flow Data with Timelines and Event Plots," month unknown, 2007, 16 pages, VizSEC.

Popa, Lucian, et al., "Building Extensible Networks with Rule-Based Forwarding," In USENIX OSDI, Month Unknown, 2010, 14 pages.

Sherwood, Rob, et al., "Carving Research Slices Out of Your Production Networks with OpenFlow," ACM SIGCOMM Computer Communications Review, Jan. 2010, 2 pages, ISO, vol. 40, No. 1.

Sherwood, Rob, et al., "FlowVisor: A Network Virtualization Layer," Oct. 14, 2009, 15 pages, OPENFLOW-TR-2009-1.

Tavakoli, Arsalan, et al., "Applying NOX to the Datacenter," month unknown, 2009, 6 pages, Proceedings of HotNets.

Yu, Minlan, et al., "Scalable Flow-Based Networking with DIFANE," Aug. 2010, 16 pages, In Proceedings of SIGCOMM.

Non-Published Commonly Owned U.S. Appl. No. 15/588,727, filed May 8, 2017, 56 pages, Nicira, Inc.

\* cited by examiner

VISUALIZATION OF PACKET TRACING OPERATION RESULTS

RELATED APPLICATIONS

Benefit is claimed under 35 U.S.C. 119(a)-(d) to Foreign Application Serial No. 201741007938 filed in India entitled "VISUALIZATION OF PATH BETWEEN LOGICAL NETWORK ENDPOINTS", on Mar. 7, 2017, by NICIRA, INC. which is herein incorporated in its entirety by reference for all purposes.

The present application Ser. No. is related in subject matter to U.S. patent application Ser. No. 15/588,727, now published as U.S. Patent Publication 2018/0262594, which is incorporated herein by reference.

BACKGROUND

Network management applications that allow a user to configure and view logical networks in a datacenter (e.g., an enterprise datacenter, a multi-tenant datacenter, etc.) have traditionally provided users with a primarily text-based user interface. These applications enable users (e.g., network administrators) to view information about their networks via text information with, perhaps, simple image representations of basic components (e.g., simple raster images that represent host machines, virtual machines, switches, routers, etc.) that are not representative of the specific features of a user's particular components. Similarly, troubleshooting information (e.g., packet traces) are provided as text logs. These text logs can be parsed with some work, but identifying important details (e.g., where in the network a particular packet was dropped) may be difficult with such an interface.

BRIEF SUMMARY

Some embodiments provide a visualization of a path between endpoints of a logical network that illustrates both the logical network components along the path as well as the physical network components that implement those logical network components for packets sent along the path. The visualization of some embodiments also aligns (e.g., vertically, horizontally, etc.) these physical and logical network components to illustrate the correspondence between the logical network components and the physical network components that implement them.

In some embodiments, the visualization is provided in a user is in response to input selecting a source logical network endpoint and a destination logical network endpoint. These logical network endpoints may be virtual machines or other data compute nodes that are attached to a port of a logical switch, uplink ports of a logical router that represent a connection of the logical network to external networks (e.g., the Internet), or other endpoints. These endpoints may be attached to logical ports on the same logical switch, or different to logical switches separated by one or more logical routers.

The visualization, as mentioned, aligns the logical network components with the physical network components that implement them. The physical network components, in some embodiments, may include the host machines on which the virtual machines or other data compute nodes (i.e., the logical network endpoints) operate, as well as physical machines that implement centralized routing components of logical routers. Each host machine for hosting the data compute nodes, in some embodiments, includes a managed forwarding element (operating, e.g., within the virtualization software of the host machine) that implements the logical networks for the data compute nodes that reside on the host machine. Thus, for example, the managed forwarding element will implement the logical switches to which its data compute nodes attach, as well as distributed routing components of the logical routers to which those logical switches attach, other logical switches attached to those distributed routing components, etc. Logical routers may include centralized routing components (e.g., for providing stateful services), and these centralized routing components are implemented on a separate physical machine (e.g., as a virtual machine or within a forwarding element datapath on the physical machine). The forwarding elements of these hosts may also implement the various logical switches and distributed routing components as needed.

In physical networks that use first-hop processing (i.e., the first managed forwarding element to process a packet performs logical processing not only for the first logical switch but also any other distributed logical network components until the packet needs to be either delivered to its destination or sent to a centralized routing component), the physical network component on which the source endpoint operates may implement multiple logical network components for packets sent from that endpoint. In this case, some embodiments align each physical network component (e.g., the host machine of the source endpoint) with the initial logical network component that it implements for such packets, with the implication that each subsequent logical network component is also implemented by that same physical network component until the next physical network component is reached. In addition, logical routers that may contain both distributed and centralized aspects are shown as a single component in some embodiments, with the single component aligned with the physical machine on which the centralized component is implemented (although the physical network component prior to that may implement the distributed aspect).

In some embodiments, the path visualization uses easily customizable graphics (e.g., scalable vector graphics (SVG)). In addition to illustrating the physical network components (e.g., the host machines), some embodiments illustrate the different physical ports (e.g., network interface controllers (NICs)) of the physical components, as well as indications as to when these physical ports are aggregated (e.g., using NIC teaming). Some embodiments use different colors or other indicators to (i) differentiate the physical network components from the logical network components and (ii) differentiate healthy components and connections (e.g., tunnels between physical components) from those that are down. In addition, different embodiments may use colors or other indicators to indicate other aspects of the network, such as to indicate logical and physical interfaces of components, etc.

Within the displayed visualization, the components are selectable in some embodiments to provide additional information about a logical or physical component. Via a mouse-over, click, tap (e.g., for a touchscreen), or other selection input, an administrator can select a component, an interface of a component, etc. In response, the user interface displays information about the component, such as the name, status, and/or other information (e.g., for a physical component, an interface, a tunnel between physical components, etc.). Some embodiments provide information for only the physical components, while other embodiments provide additional information upon selection for the logical components as well (e.g., the name, relevant ingress and egress interfaces, etc. for a logical forwarding element, etc.).

Some embodiments also provide the above-described visualization or a similar path visualization along with information regarding a packet tracing operation from the source endpoint to the destination endpoint, with a visual linking between the packet tracing information and the path visualization. The packet tracing operation of some embodiments injects a trace packet, that simulates a packet sent from the source endpoint, at the first physical component (e.g., the first hop managed forwarding element operating on the same host machine as a source data compute node). The physical components along the path process the trace packet as they would an actual packet sent by the source, but in some embodiments (i) the packet is not actually delivered to its destination and (ii) the physical components that process the packet send messages to a centralized controller or manager regarding the processing of the packet (e.g., both logical and physical processing).

The messages sent to the controller may indicate that a forwarding element has performed various actions, such as physical receipt of a packet at a particular port, ingress of a packet to a logical forwarding element, logical forwarding of a packet according to a logical forwarding element, application of a firewall, access control, or other rule for a logical forwarding element to a packet, physical forwarding (e.g., encapsulation and output) by a managed physical forwarding element of a packet, dropping a packet, delivery of a packet to its destination endpoint (which is not actually performed, as mentioned), etc. The display of the packet tracing information, in some embodiments, includes a list of these messages, with each message indicating a type (e.g., drop, forward, deliver, receive), a physical network component that sent the message, and a logical network component to which the message relates (if the message is not a purely physical network action).

To link to the visualization of the physical and logical network components, the user interface representation of each of the messages is selectable (e.g., with a mouse-over, click, tap, or other input). Upon selection of a particular message, the user interface highlights the physical network component that generated and sent the message as well as the logical network component to which the message relates (if the message has such a component). Similarly, some embodiments, selection of a physical network component in the path visualization causes the user interface to highlight the messages generated and sent by that component, while selection of a logical network component causes the user interface to highlight the messages that relate to that component.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a visualization of a path between endpoints of a logical network that illustrates both the logical network components along the path as well as the physical network components that implement those logical network components for packets sent along the path. The visualization of some embodiments also aligns (e.g., vertically, horizontally, etc.) these physical and logical network components to illustrate the correspondence between the logical network components and the physical network components that implement them.

Figure 1:
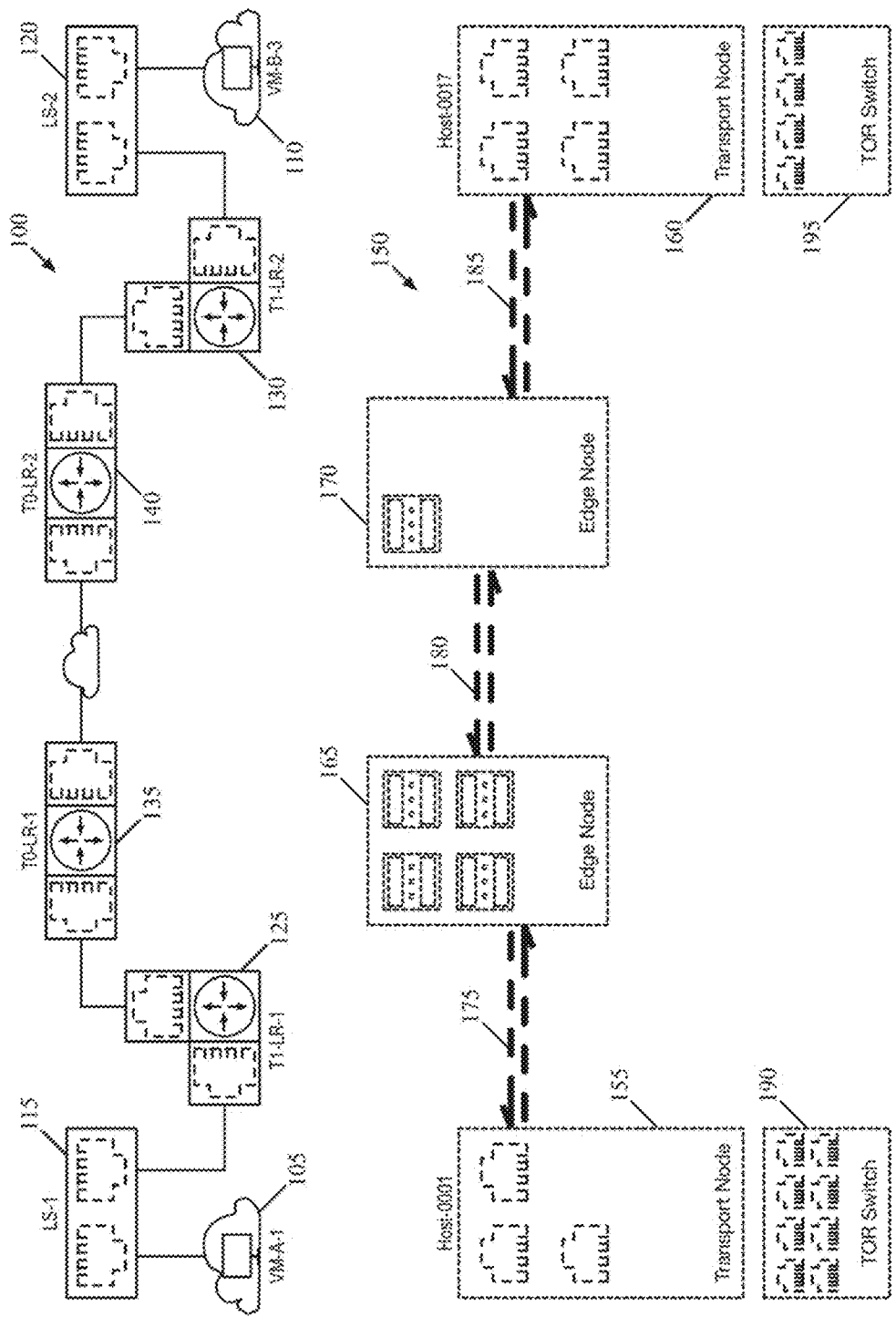
FIG. 1 illustrates an example of a visualization that shows both a logical network path and a physical network path.

FIG. 1 illustrates an example of such a visualization, showing both a logical network path 100 and a physical network path 150. In some embodiments, such a visualization is provided in a user interface in response to input selecting a source logical network endpoint and a destination logical network endpoint. These logical network endpoints may be virtual machines or other data compute nodes that are attached to a port of a logical switch, uplink ports of a logical router that represent a connection of the logical network to external networks (e.g., the Internet), or other endpoints. These endpoints may be attached to logical ports on the same logical switch, or different logical switches separated by one or more logical routers.

In this case, the endpoints are two virtual machines (VMs), represented by graphics 105 (for VM-A-1) and 110 (for VM-B-3). The first VM 105 attaches to a first logical switch 115 (LS-1), while the second VM 110 attaches to a second logical switch 120 (LS-2). It should be noted that, for simplicity, the reference numbers used for the various graphical representations of the components may also be used to refer to the components themselves. A packet sent from the first VM 105 to the second VM 110 would take a logical path through the first logical switch 115 to a first tier-1 logical router 125, then a first tier-0 logical router 135 (differences between tier-1 and tier-0 logical routers of some embodiments are explained below), a second tier-0 logical router 140, a second tier-1 logical router 130, and the second logical switch 120 in order to reach the second VM 110. In addition, two logical port graphics are shown for each of these components 115-140, representing the ingress (on the left) and egress (on the right) ports for each component, for packets sent from the first VM 105 to the second VM 110. In many cases, logical switches (and logical routers) will have many more logical ports than those shown in the path visualization. For instance, logical switches may have hundreds or even thousands of ports for different VMs or other data compute nodes that attach to them. Tier 1 logical routers (also referred to as tenant logical routers), such as the logical router 125, may have multiple logical switches connected to different logical ports. Similarly, tier 0 logical routers (also referred to as provider logical routers), such as the logical router 135, may have multiple logical ports for other tier-1 logical routers and/or multiple uplink ports for connecting to external networks. Given the large number of possible logical ports, some embodiments only show the ingress, and egress ports for the path between the specified endpoints.

The logical port graphics are shown as dashed lines in this and subsequent diagrams to represent a different color than the solid lines of the logical components. Some embodiments use various different colors to represent (i) logical network components (shown as solid lines in these examples), (ii) physical network components (shown as short dashed lines), (iii) physical and logical ports/interfaces/connections that are currently operational (shown as longer dashed lines), and (iv) physical and logical ports/interfaces/connections that are not currently operational (shown as a combination of short and long dashes). For instance, some embodiments use blue to represent logical components, brown to represent physical components, green to represent interfaces and connections that are up, and red to represent interfaces and connections that are down. Some embodiments also use gray for interfaces and connections whose state is not known, and orange for interfaces and connections that are in a mix of states (e.g., a tunnel that is up in one direction and down in the other direction, or an interface that is working for certain traffic and not other traffic). It should be understood that other combinations of colors or other indicators may be used; for instance, using the logical and physical component colors for logical and physical interfaces that are operational, using the same color for logical and physical components, using different colors for different types of components, etc.

The visualization, as mentioned, aligns the logical network components with the physical network components that implement them. The physical network components, in some embodiments, may include the host machines on which the virtual machines or other data compute nodes (i.e., the logical network endpoints) operate, as well as physical machines that implement centralized routing components of logical routers. Each host machine for hosting the data compute nodes, in some embodiments, includes a managed forwarding element (operating, e.g., within the virtualization software of the host machine) that implements the logical networks for the data compute nodes that reside on the host machine. Thus, for example, the managed forwarding element (MFE) will implement the logical switches to which its data compute nodes attach, as well as distributed routing components of the logical routers to which those logical switches attach, other logical switches attached to those distributed routing components, etc. Logical routers may include centralized routing components (e.g., for providing stateful services), and these centralized routing components are implemented on a separate physical machine (e.g., as a virtual machine or within a forwarding element datapath on the physical machine). The forwarding elements of these hosts may also implement the various logical switches and distributed routing components as needed.

In this case, the physical network path 150 includes two host machines 155 (Host-0001) and 160 (Host-0017), also referred to as transport nodes, on which the first and second VMs 105 and 110 reside, respectively. In addition, in this case, each of the tier-0 logical routers includes a centralized routing component that is along the path between the VMs, and thus the physical machines 165 and 170 (also referred to as edge nodes) implementing these centralized routing components are shown as well. In the case of the host machines 155 and 160, some embodiments display all of the physical interfaces of these machines (using, e.g., the same color as the logical ports shown for the logical components 115-140). These are the physical network interface controllers (PNICs) through which a host machine connects to the datacenter network, not the virtual network interface controllers (VNICs) through which the VMs operating on the host connect to the MFE (as a typical host will have more VMs than can be easily displayed). The representations of the physical machines 165 and 170 implementing the centralized logical routing components illustrate the various machines in an edge cluster (i.e., the first edge cluster shown by component 165 includes four edge nodes, while the second edge cluster shown by component 170 has only one edge node). In addition, the physical path between the physical host machines 155 and 160 will typically involve tunnels (e.g., through various switches and/or routers of a datacenter that do not implement the logical networks). Representations of such tunnels 175-185 are displayed in the path visualization of some embodiments. In some embodiments, these tunnels are shown in the same color as the physical and logical interfaces.

In physical networks that use first-hop processing (i.e., the first MFE to process a packet performs logical processing not only for the first logical switch but also any other distributed logical network components until the packet needs to be either delivered to its destination or sent to a centralized routing component), the physical network component on which the source endpoint operates may implement multiple logical network components for packets sent from that endpoint. In this case, some embodiments align each physical network component (e.g., the host machine of the source endpoint) with the initial logical network component that it implements for such packets, with the implication that each subsequent logical network component is also implemented by that same physical network component until the next physical network component is reached. In addition, logical routers that may contain both distributed and centralized aspects are shown as a single component in some embodiments, with the single component aligned with the physical machine on which the centralized component is implemented (although the physical network component prior to that may implement the distributed aspect).

In the example of FIG. 1, the MFE of the first host machine 155 implements the first logical switch 115, the first tier-1 logical router 125, and a distributed component of the tier-0 logical router 135 for packet sent from the first VM 105 to the second VM 110. At this point, the first host machine 155 tunnels the packet to the physical machine 165, which implements the centralized routing component of the first tier-0 logical router 135. This machine 165 tunnels the packet to the physical machine 170, which implements the centralized component of the second tier-0 logical router 140. Using first-hop processing principles, this machine also implements the distributed component of the logical router 140, the second tier-1 logical router 130, and the second logical switch 120. Finally, the packet is tunneled to the host machine 160, which performs additional processing for the logical switch 120 and delivers the packet to the VM 110.

This figure also illustrates top-of-rack (TOR) switches 190 and 195 among the physical components. Some embodiments include the TOR switches to which the host machines connect (i.e., the host machines that host the logical network endpoints, in this case host machines 155 and 160). These TOR switches generally do not perform logical network processing, except when the host machine is either a physical server that itself is the logical network endpoint (i.e., it does not host VMs or other data compute nodes) or when the host machine is a legacy machine that is not capable of performing logical network processing. In some cases, a single host machine (e.g., the host machine 155) may connect to multiple TOR switches. In this case, some embodiments provide selectable items 191 that allow a user to move through the various TOR switches. In different embodiments, users can select these items directly, or select one of the physical interfaces represented in the host machine visualization in order to cause the user interface to display the particular TOR switch to which that interface connects.

Within the displayed visualization, the components are selectable in some embodiments to provide additional information about a logical or physical component. Via a mouse-over, click, tap (e.g., for a touchscreen), or other selection input, an administrator can select a component, an interface of a component, etc. In response, the user interface displays information about the component, such as the name, status, and/or other information (e.g., for a physical component, an interface, a tunnel between physical components, etc.). Some embodiments provide information for only the physical components, while other embodiments provide additional information upon selection for the logical components as well (e.g., the name, relevant ingress and egress interfaces, etc. for a logical forwarding element, etc.).

Some embodiments also provide the above-described visualization or a similar path visualization along with information regarding a packet tracing operation from the source endpoint to the destination endpoint, with a visual linking between the packet tracing information and the path visualization. The packet tracing operation of some embodiments injects a trace packet, that simulates a packet sent from the source endpoint, at the first physical component (e.g., the first hop MFE operating on the same host machine as a source data compute node). The physical components along the path process the trace packet as they would an actual packet sent by the source, but in some embodiments (i) the packet is not actually delivered to its destination and (ii) the physical components that process the packet send messages to a centralized controller or manager regarding the processing of the packet (e.g., both logical and physical processing).

The messages sent to the controller may indicate that a forwarding element has performed various actions, such as physical receipt of a packet at a particular port, ingress of a packet to a logical forwarding element, logical forwarding of a packet according to a logical forwarding element, application of a firewall, access control, or other rule for a logical forwarding element to a packet, physical forwarding (e.g., encapsulation and output) by a managed physical forwarding element of a packet, dropping a packet, delivery of a packet to its destination endpoint (which is not actually performed, as mentioned), etc. The display of the packet tracing information, in some embodiments, includes a list of these messages, with each message indicating a type (e.g., drop, forward, deliver, receive), a physical network component that sent the message, and a logical network component to which the message relates (if the message is not a purely physical network action).

To link to the visualization of the physical and logical network components, the user interface representation of each of the messages is selectable (e.g., with a mouse-over, click, tap, or other input). Upon selection of a particular message, the user interface highlights the physical network component that generated and sent the message as well as the logical network component to which the message relates (if the message has such a component). Similarly, in some embodiments, selection of a physical network component in the path visualization causes the user interface to highlight the messages generated and sent by that component while selection of a logical network component causes the user interface to highlight the messages that relate to that component.

The above describes the logical and physical path visualization of some embodiments. The following sections describe this path visualization and its use in illustrating a packet tracing operation in greater detail. Section I describes the path visualization user interface of some embodiments. Next, Section II describes the use of this path visualization along with packet tracing results. Finally, Section III describes an electronic system with which some embodiments of the invention are implemented.

I. Path Visualization Tool

As mentioned, some embodiments provide a visualization of a path between endpoints of a logical network that illustrates both the logical network components along the path as well as the physical network components that implement those logical network components for packets sent along the path. The visualization of some embodiments also aligns (e.g., vertically, horizontally, etc.) these physical and logical network components to illustrate the correspondence between the logical network components and the physical network components that implement them.

In some embodiments, the visualization is provided in a user interface in response to input selecting a source logical network endpoint and a destination logical network endpoint. These logical network endpoints may be virtual machines or other data compute nodes that are attached to a port of a logical switch, uplink ports of a logical router that represent a connection of the logical network to external networks (e.g., the Internet), or other endpoints. These endpoints may be attached to logical ports of the same logical switch, or different logical switches separated by one or more logical routers.

Figure 2A:
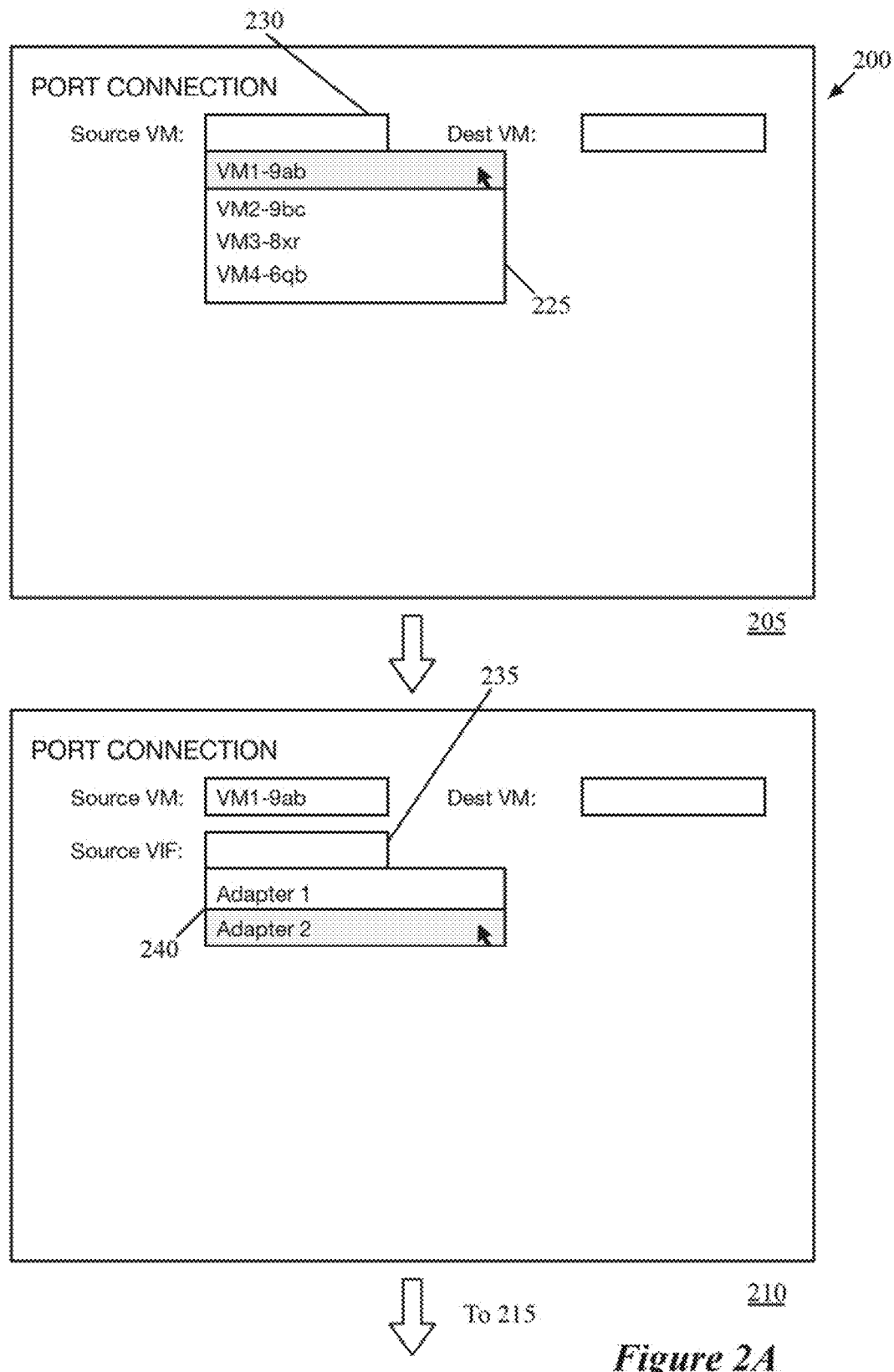
FIGS. 2A-B illustrate a GUI over four stages in which a user selects source and destination logical endpoints and is presented with a path visualization from the source endpoint to the destination endpoint.
Figure 2B:
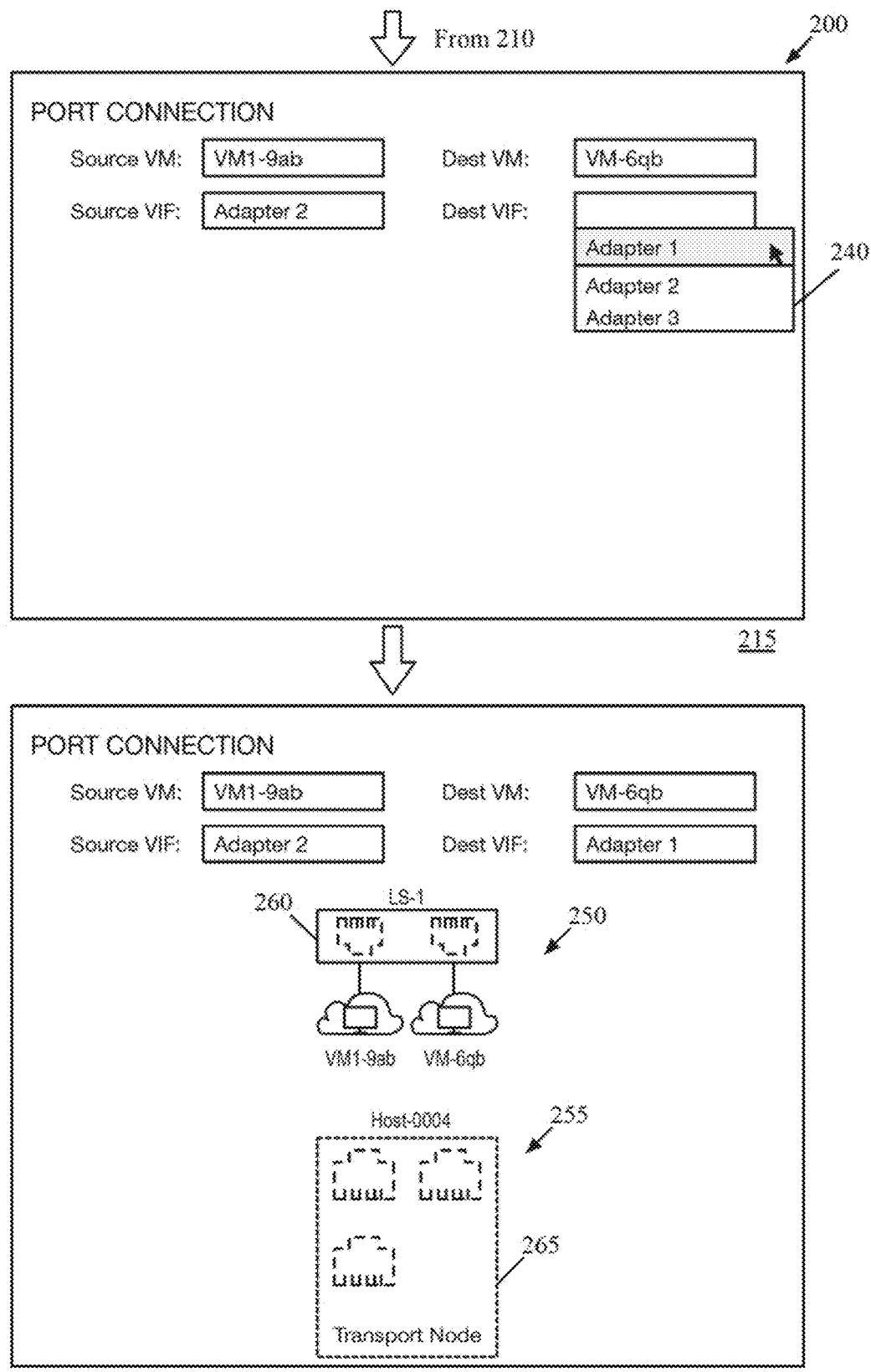

FIGS. 2A-B illustrate a GUI 200 over four stages 205-220 in which a user selects source and destination logical endpoints and is presented with a path visualization from the source endpoint to the destination endpoint. In some embodiments, this GUI 200 is presented within the context of a cloud management or network-specific management application used by a network administrator. The administrator may manage a datacenter or set of datacenters as a whole or may manage a logical network or set of logical networks within that datacenter (e.g., as a tenant of the datacenter). In some embodiments, the management application used by the administrator includes, among other options, a port connection tool that allows the administrator to select source and destination ports in their logical network and view the logical and physical paths between the endpoints.

The first stage 205 illustrates that the user has selected the path visualization ("port connection") tool, and is beginning to choose a source endpoint. Some embodiments present the user with a list of logical ports to select from, or present a list of logical switches and then logical ports of the selected switch (this may also include any logical routers with uplink ports that connect to an external network, which may be treated as a logical network endpoint). In other embodiments, as shown in the GUI 200, the user initially chooses a VM (or another type of data compute node, in case the logical network includes containers or other options), and the GUI then presents a list of virtual interfaces of that VM.

In the first stage, the user has provided input to cause the GUI 200 to display a drop-down menu 225 with a list of VMs that the user manages. In some embodiments, by selecting the box 230 (e.g., with a mouse click, keyboard input, touch input, etc.), the user causes the GUI to display such a menu. The user selects the first VM (VM1-9ab), as shown. This causes the GUI 200 to display, in the second stage 210, a source virtual interface (VIF) selection box 235, which the user has selected to bring up a drop-down menu 240. This drop-down menu 240 provides options for each of the network adapters of the selected VM. Whereas a logical network may have hundreds or thousands of logical ports, selection in this manner (first VM, then VNIC or VIF) provides an easier mechanism for a user to select a logical network endpoint in some embodiments. In this case, the user selects the second choice (Adapter 2), as shown.

The third stage 215 illustrates the GUI 200 after the user has selected a destination VM (VM-6qb) and is in the process of selecting a VIF for that VM from a drop-down menu 245. With the two logical network endpoints selected, in the fourth stage 220 the GUI displays the logical and physical path visualizations 250 and 255.

In this example, the two logical network endpoints are (i) both attached to the same logical switch 260 and (ii) both operating on the same host machine 265. As such, only a single logical component (the logical switch 260) and a single physical component (the host machine 265) appear in the path visualization. As such, a packet sent by VM1-9ab to VM-6qb would not actually leave the host machine 265. In this case, with only one logical component that is completely implemented for the path by a single physical component, aligning the two paths is simple.

It should be noted that two VMs on the same host machine could be on different logical switches connected by one or more logical routers. In such a case, if only distributed components of the logical router were required, packets would still only be processed by the MFE on the host machine. Some embodiments display only one representation of the host machine in such a case (on the source side), while other embodiments display two representations of the host machine (at either end of the path visualization).

As mentioned above, some embodiments use easily customizable graphics (e.g., scalable vector graphics (SVG)) for the path visualization. To generate the path visualization, in some embodiments the network management application provides the front-end graphical user interface (GUI), while querying a back-end network management and control system for the data used to generate the GUI. In some embodiments, the front-end application stores the graphics (e.g., for logical switches and routers, transport and edge nodes, logical and physical interfaces, tunnels, etc.), but queries the network management and control system for the most up-to-date data regarding the actual components along the logical and physical paths between two user-specified endpoints. In other embodiments, the front-end GUI is also part of the network management and control system, which the user accesses through, e.g., a browser or other remote login.

In addition to the component names and types for the logical and physical paths, in some embodiments the GUI is provided additional information about each component, interface, and connection (or a subset of the components, interfaces, and connections). In some embodiments, the components (or interfaces, connections, etc.) are selectable to provide additional information about a logical or physical component. Via a mouse-over, click, tap (e.g., for a touchscreen), or other selection input, an administrator can select a component, an interface, a tunnel representation, etc. In response, the user interface displays information about the selected item. Some embodiments provide information for only the physical components, interfaces, and tunnels, while other embodiments provide additional information upon selection for the logical components as well (e.g., the name, relevant ingress and egress interfaces, etc. for a logical forwarding element, etc.).

Figure 3:
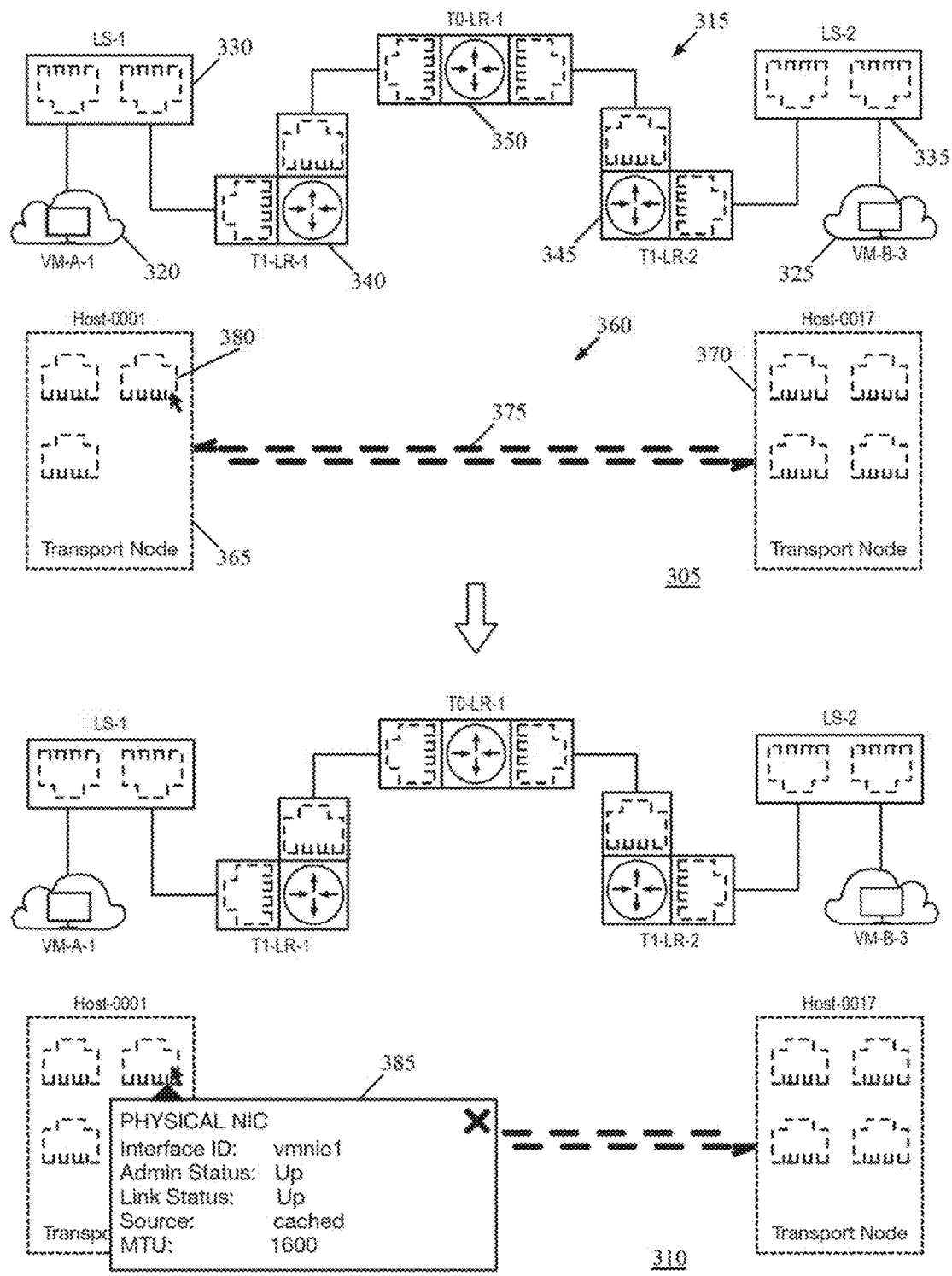
FIG. 3 illustrates an example of two endpoints on two different logical switches separated by three logical routers, with no central routing components along the path.
Figure 4:
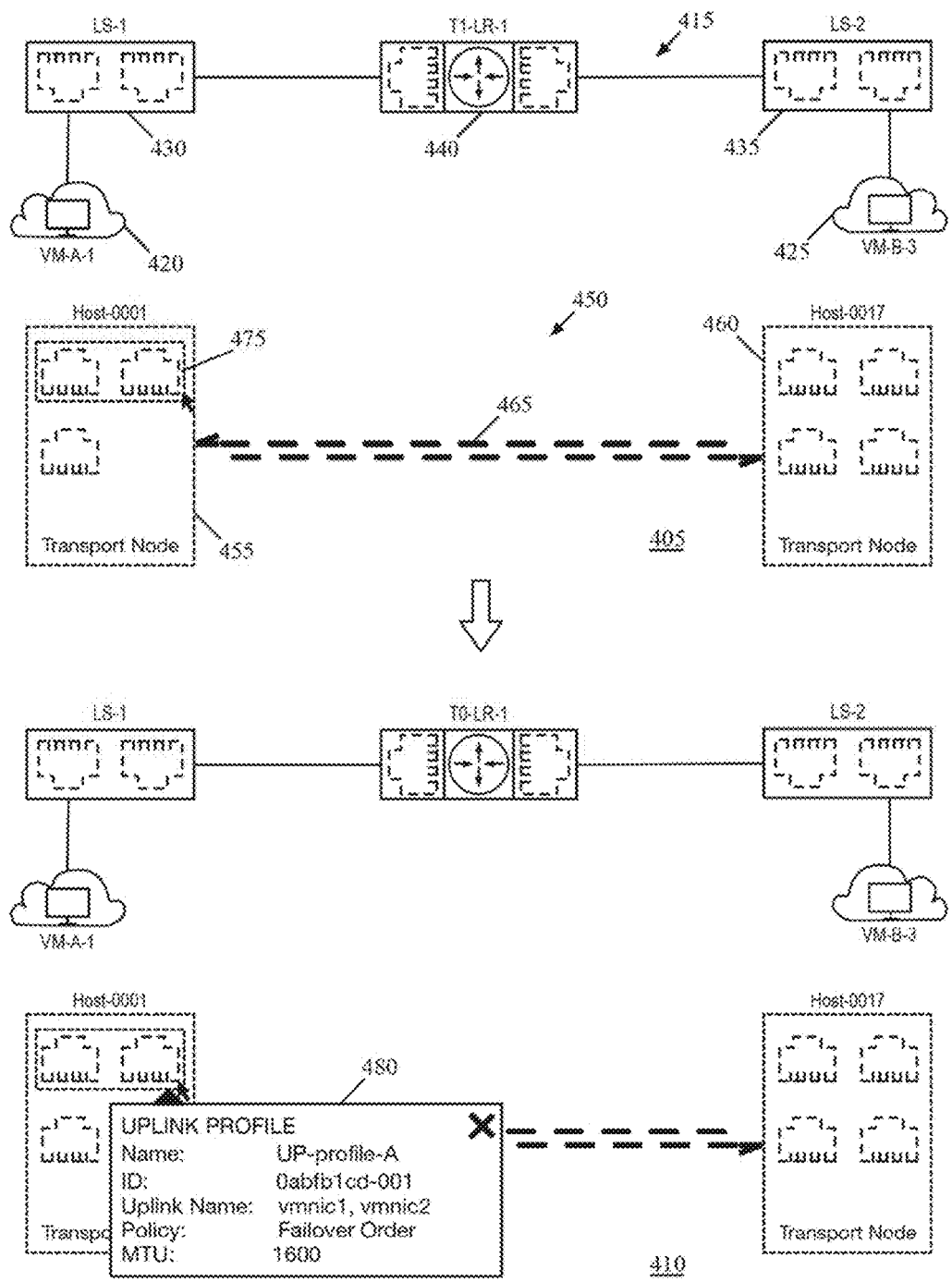
FIG. 4 illustrates an example of two endpoints on two different logical switches separated by one logical router, with no central routing component for that logical router along the path.
Figure 5:
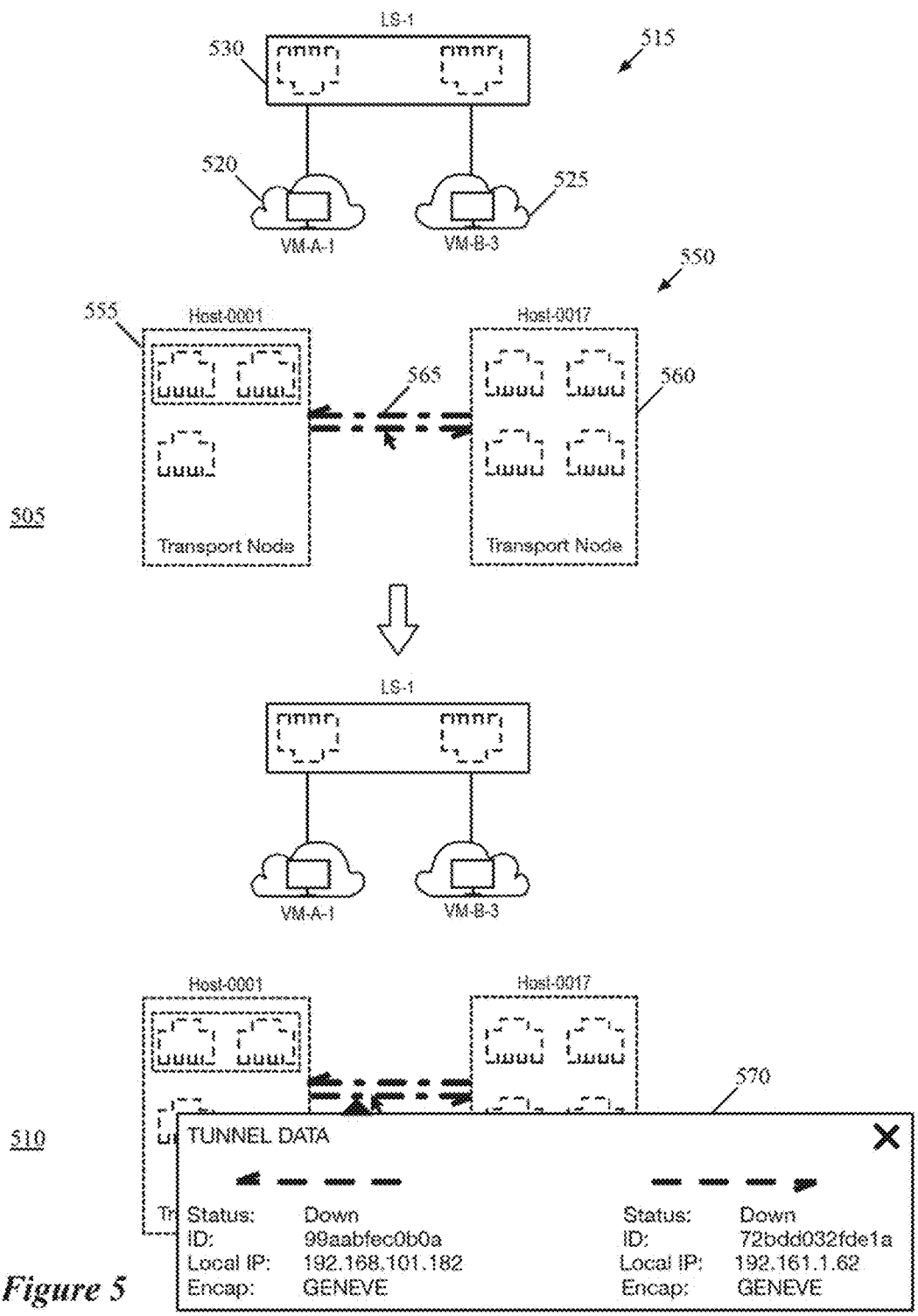
FIG. 5 illustrates an example in which two selected endpoints are on the same logical switch but operating on different host machines.

FIGS. 3-5 illustrate various examples of the GUI providing information about different components, as well as showing different types of logical and physical network paths. FIG. 3 illustrates an example of two endpoints on two different logical switches separated by three logical routers, with no central routing components along the path. This figure illustrates the path visualization over two stages 305-310, in which the GUI provides information about a physical NIC of one of the host machines.

As shown at the first stage 305, the GUI includes a logical network visualization 315 between two VMs 320 and 325 and a physical path visualization 360. A packet sent along the logical network path 315 travels (logically) from the VM 320 to a first logical switch 330, a first tier-1 logical router 340, a tier-0 logical router 350, a second tier-1 logical router 345, and a second logical switch 335, before being delivered to the destination VM 325. The physical path includes only the two host machines 365 and 370 on which the VMs 320 and 325 operate, respectively.

In this case, neither of the tier-1 logical routers 340 and 345 have centralized components (i.e., all of their routing, firewall, etc. functionality can be performed in a distributed manner), and any centralized components of the tier-0 logical router 350 do not need to process packets sent between the two VMs 320 and 325 (e.g., because such centralized components only handle north-south traffic entering or leaving the logical network, rather than east-west traffic between two logical network VMS.

As a result, all of the logical processing up to the egress aspects of the second logical switch 335 are performed by the MFE on the first host machine 365, in some embodiments. That is, this MFE performs the processing for logical switch 330 to logically forward a packet (sent by the source VM 320) to the first tier-1 logical router 340, for the logical router 340 to logically forward the packet to the tier-0 logical router 350, for the logical router 350 to logically forward the packet to the second tier-1 logical router 345 (noting that, in some embodiments, a transit logical switch that is not shown to the user may be inserted between each pair of logical routers), for the logical router 345 to logically forward the packet to the second logical switch 325, and for this logical switch to logically forward the packet to the egress port associated with the VM 325. The packet is then tunneled (with this tunnel 375 shown in the physical network path visualization 360) to the host machine 370 on which the second VM 325 operates. The MFE for this host machine 370 performs additional processing for the logical switch 335 and delivers the packet to the VM 325. As such, the first host machine 365 aligns with the first logical switch 330 and the second host machine 370 aligns with the second logical switch 335.

At this stage 305, the user selects a physical interface representation 380 within the representation of the first host machine 365. As mentioned above, these selections may be made via a cursor controller (e.g., via a mouse click), a touch interaction, a keyboard input, or via a different input mechanism). In some embodiments, moving the cursor over a physical component causes the GUI to display additional information, while other embodiments require the user to perform additional interaction (e.g., a mouse click).

The second stage 310 illustrates the GUI displaying additional information 385 about the physical interface 380. In this example, for a physical NIC, the GUI displays an interface identifier, the administrative and link status of the NIC, a source, and a maximum transmission unit (MTU) size. Different embodiments may include different information about the NIC (e.g., amount of ingress and egress traffic processed by the NIC, etc.). In all of the FIGS. 3-5, it should be understood that these are merely examples of information that may be displayed about different types of components, and other embodiments may display different sets of information.

FIG. 4 illustrates an example of two endpoints on two different logical switches separated by one logical router, with no central routing, component for that logical router along the path. This figure provides the path visualization over two stages 405-410, in which the GUI provides information about a physical uplink (NIC team) of one of the host machines. As shown at the first stage 405, the GUI includes a logical network visualization 415 between two VMs 420 and 425 and a physical path visualization 450. A packet sent along the logical network path 415 travels (logically) from the VM 420 to a first logical switch 430, a tier-1 logical router 440, and a second logical switch 435, before being delivered to the destination VM 425. The physical path includes only the two host machines 455 and 460 on which the VMs 420 and 425 operate, respectively.

In this example, the representation of the first physical host machine 455 includes a box 475 that encompasses two of its physical interfaces. Such graphics are used to indicate NIC teaming in some embodiments. In some embodiments, a user may aggregate multiple physical NICs to operate as one higher-bandwidth data path by load-sharing traffic between the NICs in the team.

In this case, the tier-1 logical router 440 does not have a centralized component, or its centralized component does not handle traffic between two logical switches that both attach to the logical router. As a result, all of the logical processing up to the egress aspects of the second logical switch 435 are performed by the MFE on the first host machine 455, in some embodiments. That is, this MFE performs the processing for the first logical switch 430 to logically forward a packet (sent from the source VM 420) to the logical router 440, for the logical router 440 to logically forward the packet to the second logical switch 435, and for this logical switch to logically forward the packet to the egress port associated with the VM 425. The packet is then tunneled (with this tunnel 465 shown in the physical network path visualization 450) to the host machine 460 on which the second VM 425 operates. The MFE for this host machine 460 performs additional processing for the logical switch 425 and delivers the packet to the VM 425. As such, the first host machine 455 aligns with the first logical switch 430 and the second host machine 460 aligns with the second logical switch 435.

At this stage 405, the user selects the NIC team representation 475. The second stage 410, as a result, illustrates the GUI displaying additional information 480 about the NIC team (or uplink) 475. In this example, for a NIC team, the GUI displays its name and identifier (i.e., the name and identifier of the team), the names of the NICs that make up the team, the policy for NIC selection within the team (in this case, an explicit failover order is specified), and MTU size. Different embodiments may include different information about the NIC team (e.g., amount of ingress and egress traffic processed by the NICs, further details about the NIC selection policy, etc.).

FIG. 5 illustrates an example in which two selected endpoints are on the same logical switch but operating on different host machines. This figure provides the path visualization over two stages 505-510, in which the GUI provides information about the tunnel between the two host machines. As shown at the first stage 505, the GUI includes a logical network visualization 515 between two VMs 520 and 525 and a physical path visualization 550. A packet sent along the logical network path between the two VMs 520 and 525 is processed logically by only a logical switch 530, to which both VMs connect. The physical path includes the two host machines 555 and 560 on which the two VMs 520 and 525 operate, respectively.

The MFE in the first host machine 555 would perform processing for the logical switch 530 to determine the logical egress port associated with the VM 525, and then forward the packet to the second host machine 560 via the tunnel 565 between the two. However, in this example, as shown by the dashed-dotted line (representative of, e.g., a red line), the tunnel is currently down. This could occur because of an issue with the NIC(s) or MFEs at host machine 555 or 560, a problem with the datacenter network between the two host machines (e.g., the switches and routers that do not perform logical processing), etc.

At this stage 505, the user selects the representation of the tunnel 565 in the physical path visualization 550. The second stage, as a result, illustrates the GUI, displaying additional information 570 about the tunnel. As shown, for tunnels, some embodiments display information about each direction of the tunnel. For each direction, this example displays the status of the connection (down, in this case), an identifier, the local network (IP) address, and the type of encapsulation used (e.g., VXLAN, GENEVE, STT, etc.).

The above-described FIGS. 3-5 show examples of the provision of additional information regarding physical components, interfaces, and connections. Some embodiments provide this information for only the physical components of the path visualization, while other embodiments provide additional information upon selection for the logical components as well. For example, some embodiments provide, for logical forwarding elements, the name and/or identifier, the relevant ingress and egress ports for the path, packet statistics collected for the logical forwarding element, etc. Similarly, identifiers, statistics, and other information may be provided for logical ports, centralized routing components, etc.

Figure 6:
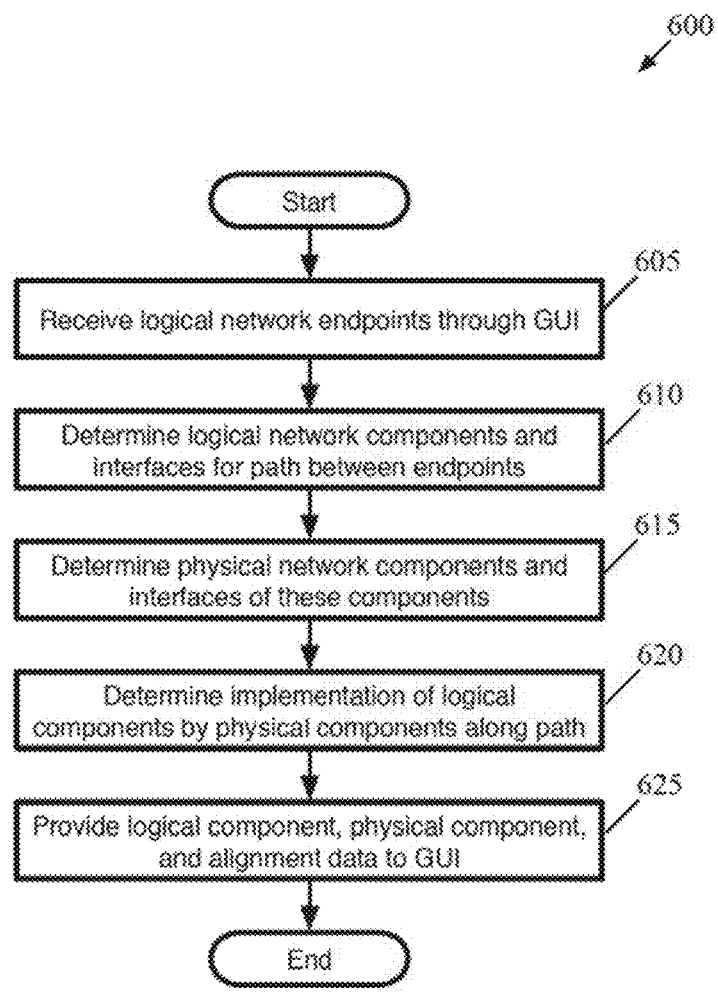
FIG. 6 conceptually illustrates a process of some embodiments for generating a path visualization for a set of logical network endpoints.

FIG. 6 conceptually illustrates a process 600 of some embodiments for generating a path visualization for a set of logical network endpoints (e.g., a pair of source and destination endpoints). This process 600 is performed, in some embodiments, by a network management application that is integrated with a network control and management system for managing the implementation of logical networks within a physical network (e.g., a datacenter). In some embodiments, the network management application operates on a user device (e.g., an administrator computer) and queries the network control system for data. In other embodiments, the network management application operates on back-end devices (e.g., a cluster of computers, on which the management and control system operates), and the administrator remotely accesses the application (e.g., through a web browser).

As shown, the process 600 begins by receiving (at 605) a set of logical network endpoints through a GUI. In some embodiments, the user specifies two logical switch ports (on the same or different logical switches) or a logical switch port and a tier-0 logical router uplink for communicating with external networks (in some embodiments, the administrator may want to visualize the path for packets sent from a VM to the external network). In other embodiments, the user specifies a particular data compute node (e.g., a VM) or data compute node interface (e.g., a particular VIF of a VM) for each endpoint, as shown in FIG. 2.

The process 600 then determines (at 610) the logical network components and interfaces for the path between endpoints. That is, the process determines the set of logical components through which a packet sent from the source endpoint to the destination endpoint would pass. This will generally include the logical switches to which the two endpoints connect (if they both connect to logical switches), as well as any logical routers required for the packets to traverse the logical network between the endpoints. In most cases, the set of logical components between two endpoints will fit one of four models: (i) two endpoints on the same logical switch (e.g., as shown in FIG. 5), (ii) two different logical switches with a single tier-1 logical router in-between (e.g., as shown in FIG. 4), (iii) two different logical switches with two tier-1 logical routers and a single tier-0 logical router in-between (e.g., as shown in FIG. 3), and two different logical switches with two tier-1 logical routers and a two tier-0 logical routers in-between (e.g., as shown in FIG. 1). In addition, these components will often have many logical ports, and the process determines the specific ports that enable the connections between the endpoints and the logical switches as well as the interfaces that connect the components (e.g., the logical switch port that links to a logical router, etc.). For each component and each interface, some embodiments also determine the data that might be requested within the GUI (e.g., by a user selecting the component).

Next, the process 600 determines (at 615) the physical network components along the path and the interfaces of these components. That is, the process determines the set of physical components that will perform logical processing on a packet sent from the source endpoint to the destination endpoint (as opposed to physical network switches and routers that might forward an encapsulated packet) sent between these components. This will generally include the host machines on which the endpoints operate (when the endpoints are VMs or other data compute nodes) as well as the physical machines that implement any centralized routing components through which a packet will pass. Not all logical routers will have such centralized components (e.g., a tier-1 logical router that does not implement any stateful services may not require a centralized component), and not all packets will need to pass through the centralized components of logical routers they traverse (e.g., the centralized component of a tier-0 logical router may only process packets ingressing and egressing the logical network). The process also identifies the physical interfaces and the teaming properties of these interfaces. In addition, the process determines the properties of these components and interfaces that might be requested within the GUI, as well as the properties of the tunnels between the physical components, in some embodiments.

The process 600 also determines (at 620) the implementation of the logical components by the physical components along the path, in order to determine the alignment of the physical and logical components. Which logical components are implemented by which physical components will depend on the path of the packet, when first-hop processing principles are applied. In general, the physical components will be configured to implement all of the logical components that they might need to, but will not necessarily implement all of these components for a particular packet. For example, if a packet between two endpoints passes through two tier-1 logical routers, but only one of them has a centralized component, the physical machine that implements the tier-0 logical router between the two will depend on the direction of the packet.

Finally, the process 600 provides (at 625) the logical component, physical component, and alignment data to the GUI. In some embodiments, this information is provided as a set of data structures, which the application converts to a graphical visualization of the paths (e.g., using SVG images). In other embodiments (e.g., when the GUI is provided on a web browser), the aligned graphical data is provided. After providing the data, the process 600 ends.

II. Packet Tracing Tool

In addition to providing the path visualization as shown in Section I, some embodiments also provide the above-described visualization or a similar path visualization along with information regarding a packet tracing operation from a source endpoint to a destination endpoint. Some such embodiments also use a visual link between the packet tracing information and the path visualization.

The packet tracing operation of some embodiments injects a trace packet, that simulates a packet sent from the source endpoint, at the first physical component (e.g., the first hop MFE operating on the same host machine as a source data compute node). The physical components along the path process the trace packet as they would an actual packet sent by the source, but in some embodiments (i) the packet is not actually delivered to its final destination and (ii) the physical components that process the packet send messages to a centralized controller or manager regarding the processing of the packet (e.g., both logical and physical processing).

The messages sent to the controller may indicate that a forwarding element has performed various actions, such as physical receipt of a packet at a particular port, ingress of a packet to a logical forwarding element, logical forwarding of a packet according to a logical forwarding element, application of a firewall, access control, or other rule for a logical forwarding element to a packet, physical forwarding (e.g., encapsulation and output) by a managed physical forwarding element of a packet, dropping a packet, delivery of a packet to its destination endpoint (which is not actually performed, as mentioned), etc. The display of the packet tracing information, in some embodiments, includes a list of these messages, with each message indicating a type (e.g., drop, forward, deliver, receive), a physical network component that sent the message, and a logical network component to which the message relates (if the message is not a purely physical network action).

Figure 7A:
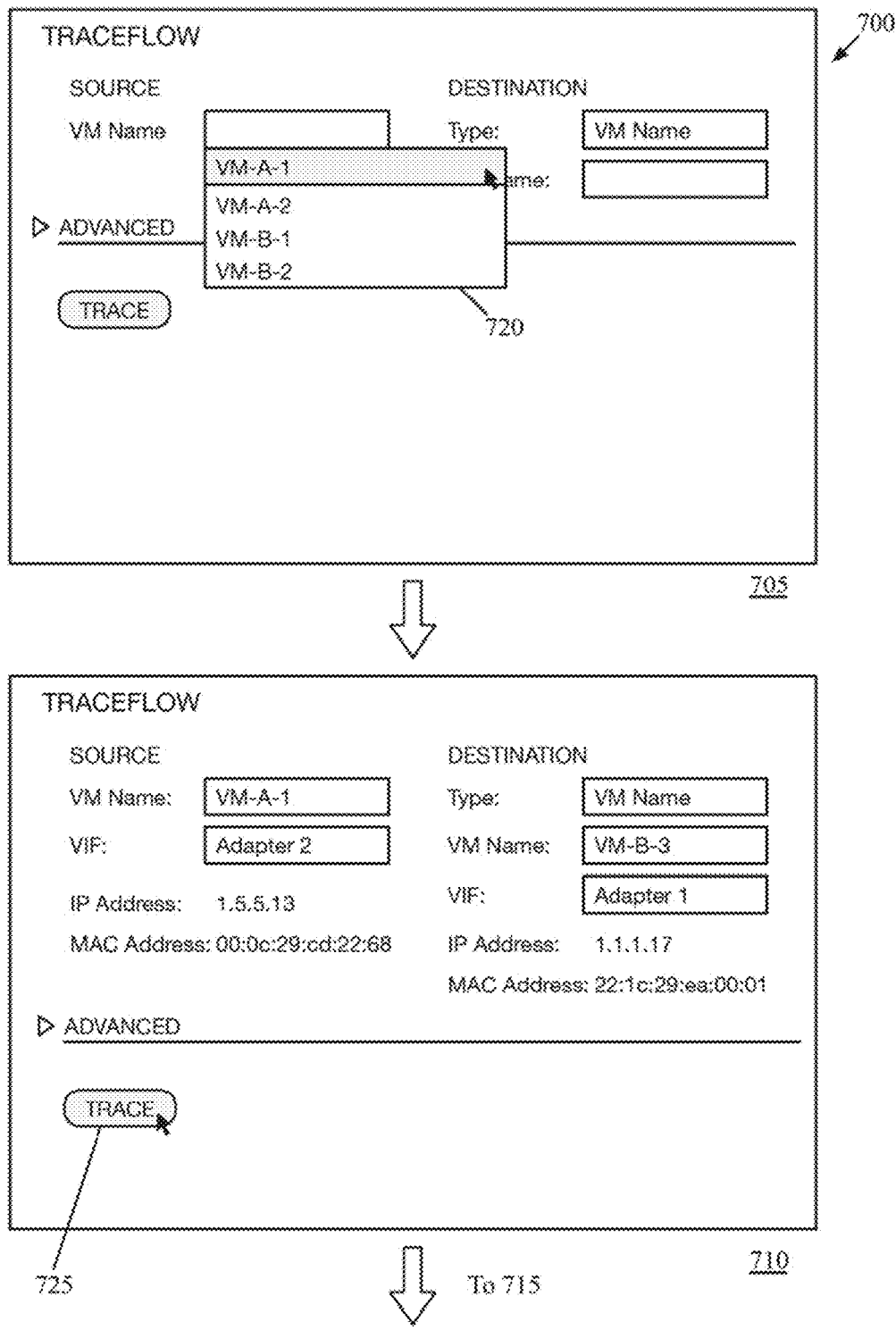
FIGS. 7A-B illustrate an example of a GUI for initiating a packet tracing operation and displaying the results of that operation over three stages.
Figure 7B:
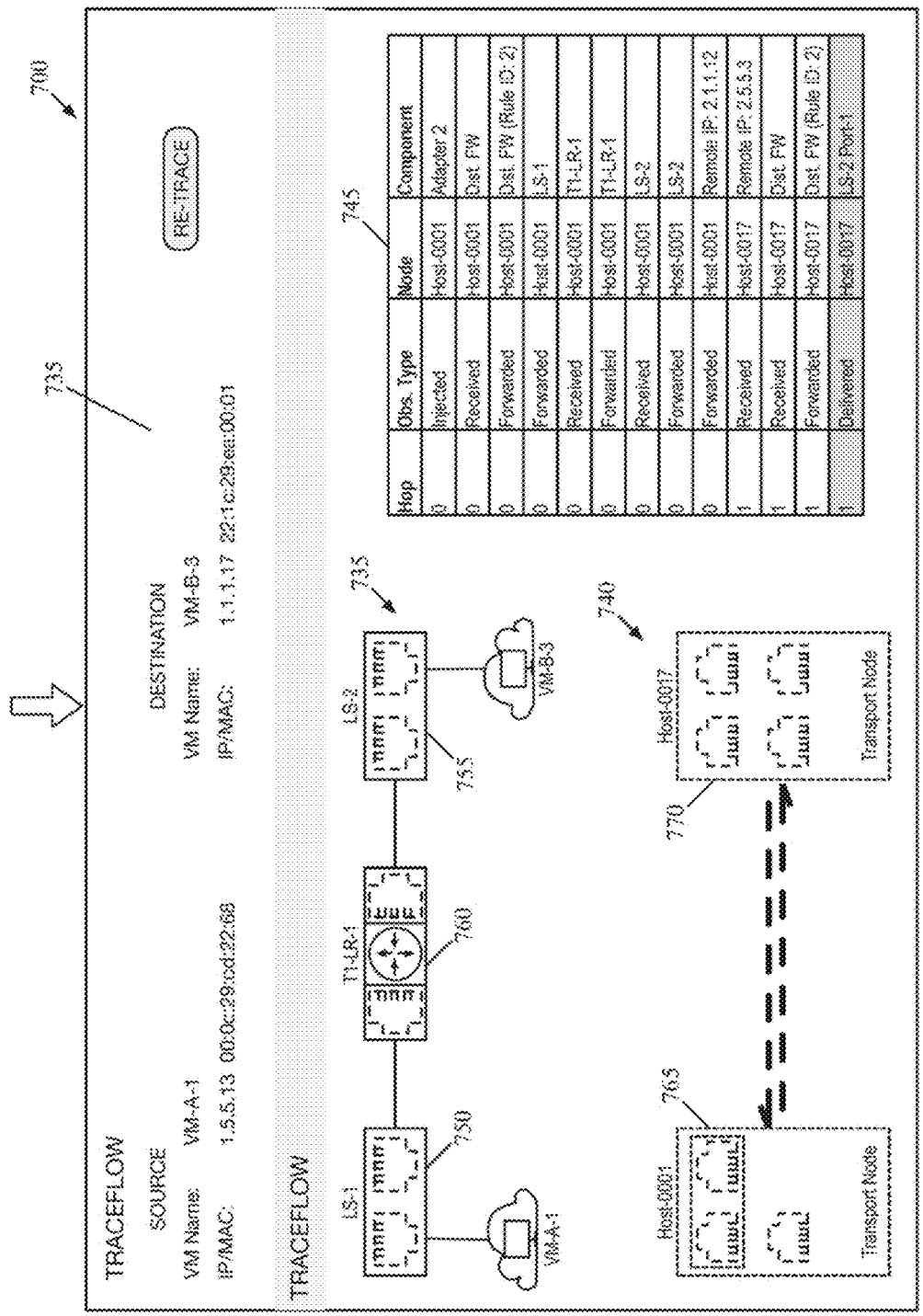

FIGS. 7A-B illustrate an example of a GUI 700 for initiating a packet tracing operation and displaying the results of that operation over three stages 705-715. In these three stages, a user provides source and destination information for a trace operation and initiates that operation, then is provided the results along with a path visualization between the endpoints. In some embodiments, this GUI 700 is presented within the context of a cloud management or network-specific management application used by a network administrator. The administrator may manage a datacenter or set of datacenters as a whole or may manage a logical network or set of logical networks within that datacenter (e.g., as a tenant of the datacenter). In some embodiments, the management application used by the administrator includes, among other options, a packet tracing tool for testing a connection between endpoints. The packet tracing tool of some embodiments allows the administrator to select source and destination ports in their logical network and view the results of sending a trace packet from the source to the destination.

The first stage 705 illustrates that the user has selected the packet tracing ("traceflow") tool, and is beginning to choose a source endpoint. In some embodiments, as shown, the source endpoint is always a VM (or other data compute node, such as a container), that can act as a packet source within the logical network). In other embodiments, the user can select other types of source endpoints, such as replicating a packet entering the logical network from an external network. The user opens a drop-down menu 720 for the source VM, and is selecting VM-A-1 in the first stage 705.

The second stage 710 illustrates the GUI 700 after the user has filled out all of the traceflow configuration options. For the source, the user has chosen a VM and virtual interface, and the GUI 700 displays the MAC and IP address of this interface (which will be the source IP and MAC address of the packet). In addition, the user has input the destination information. For the destination, the user selects a destination type (e.g., another VM or other data compute node, an uplink port of a logical router that connects to an external network, etc.). In this case, the user has selected a VM, and thus the VM and virtual interface fields are filled out as well. A virtual interface of VM-B-3 will be the destination, in this case. The GUI 700 also displays the MAC and IP address of the destination interface, although the trace packets will only have the IP address of this interface as their destination address if the two endpoints are on different logical switches (the destination MAC will initially be that of the logical router port to which the source's logical switch connects).

The GUI 700 of some embodiments also includes an "advanced" section, which is currently toggled to be not shown. In some embodiments, this allows the user to, among other options, specify characteristics of the trace packet(s) that will be sent from the source endpoint to the destination endpoint. For instance, some embodiments allow the user to specify the packet size (e.g., Ethernet frame size), initial time to live, timeout, Ethertype, payload type, and any specific payload data. The user may also specify the transport layer protocol (e.g., TCP, ICMP, UDP, etc.), and various options for that protocol (such as the ICMP identifier or sequence number).

The GUI 700 displays a "trace" button 725, which the user is selecting at stage 710. This causes the network management and control system to initiate a trace operation by generating a packet with the specified characteristics and injecting the packet at the source virtual interface. That is, the actual source VM does not send the packet, but rather the management and control system simulates the receipt of such a packet from the source VM in the MFE to which the source VIA connects. As mentioned above, the source MFE and any other physical components along the path process the trace packet as they would an actual packet sent by the source, but do not actually deliver the packet to the final destination (so that the VM does not receive a packet that it should not). In addition, the physical components send messages to the management and control system regarding their logical and physical processing of the packet.

The third stage 715 illustrates the GUI 700 displaying the results of the trace operation along with a path visualization between the source and destination endpoints. As shown, the GUI 700 of some embodiments includes a first section 730 that identifies the basic source and destination information, along with a selectable item for re-initiating the trace operation. Below this, the GUI 700 includes a section with the aligned logical and physical network path visualizations 735 and 740 on one side and a table 745 of packet tracing operation results on the other.

The aligned path visualizations 735 and 740 are the same types of visualizations described in the above section in some embodiments, though other embodiments may use different visualizations for the path through the network between the selected endpoints. In this example, the logical network path between the two VMs includes two logical switches 750 and 755, as well as one logical router 760. The physical network path, meanwhile, includes the two host machines 765 and 770 on which the source and destination VMs operate, with a tunnel between the two.

The table 745 of packet tracing operation results, in some embodiments, includes a list of messages received by the network management and control system from the physical components 765 and 770 of the physical network path. As shown, some embodiments display a row for each such message. In this case, the table indicates, for each message, the hop number (hops, here, referring to the physical components, rather than the logical components), the type of message (also called an observation), the physical node, and the logical component (for physical actions, other information may be provided).

The observation type, in some embodiments, indicates a type of action taken by the MFE that generated and sent the message to the network management and control system. In some embodiments, this may be either injection (the insertion of the packet in the initial MFE at the source host machine), receipt (e.g., receipt by a logical component at a logical ingress port, receipt of a physical packet at a host machine, etc.), forwarding (logical or physical forwarding), dropping (e.g., based on a firewall rule, a physical connection issue, etc.), and delivered (for delivery of the packet to the destination endpoint). Though not shown in this figure, in some embodiments, the table can be sorted to include only rows for specific observation types (e.g., only the forwarding messages). In some embodiments, the rows for dispositive actions (dropping, delivery) are colored differently than the other rows, as in this example (e.g., green for delivery, red for dropping).

The node indicates the name of the physical host machine that performed the action for that row, and generated the observation message. Lastly, the component field indicates the name of the logical component to which the, observation message relates. This may be the name of a logical forwarding element (e.g., a logical switch or logical router, as in the $4^{th}$-$8^{th}$ rows of the table 745, a distributed firewall (as in the $2^{nd}$ and $3^{rd}$ rows), a logical switch port, etc. In addition, for physical actions, such as the injection of the packet at a virtual interface, or the physical forwarding of an encapsulated packet, other information may be shown. The forwarding and receipt of the encapsulated packet, in this example, shows the remote IP (the destination IP address of the packet fix the forwarding message and the source IP of the packet for the receipt message). These IP addresses are not those of the source and destination logical network endpoints, but rather those of the physical NICs that send and receive the data packet.

As mentioned, the GUI of some embodiments links the logical and physical network path visualization with the representation of the packet tracing operation messages. To implement this link, in some embodiments the user interface representation of each of the messages is selectable (e.g., with a mouse-over, click, tap, or other input). Upon selection of a particular message, the user interface highlights the physical network component that generated and sent the message as well as the logical network component to which the message relates (if the message has such a component). Similarly, in some embodiments, selection of a physical network component in the path visualization causes the user interface to highlight the messages generated and sent by that component, while selection of a logical network component causes the user interface to highlight the messages that relate to that component.

Figure 8:
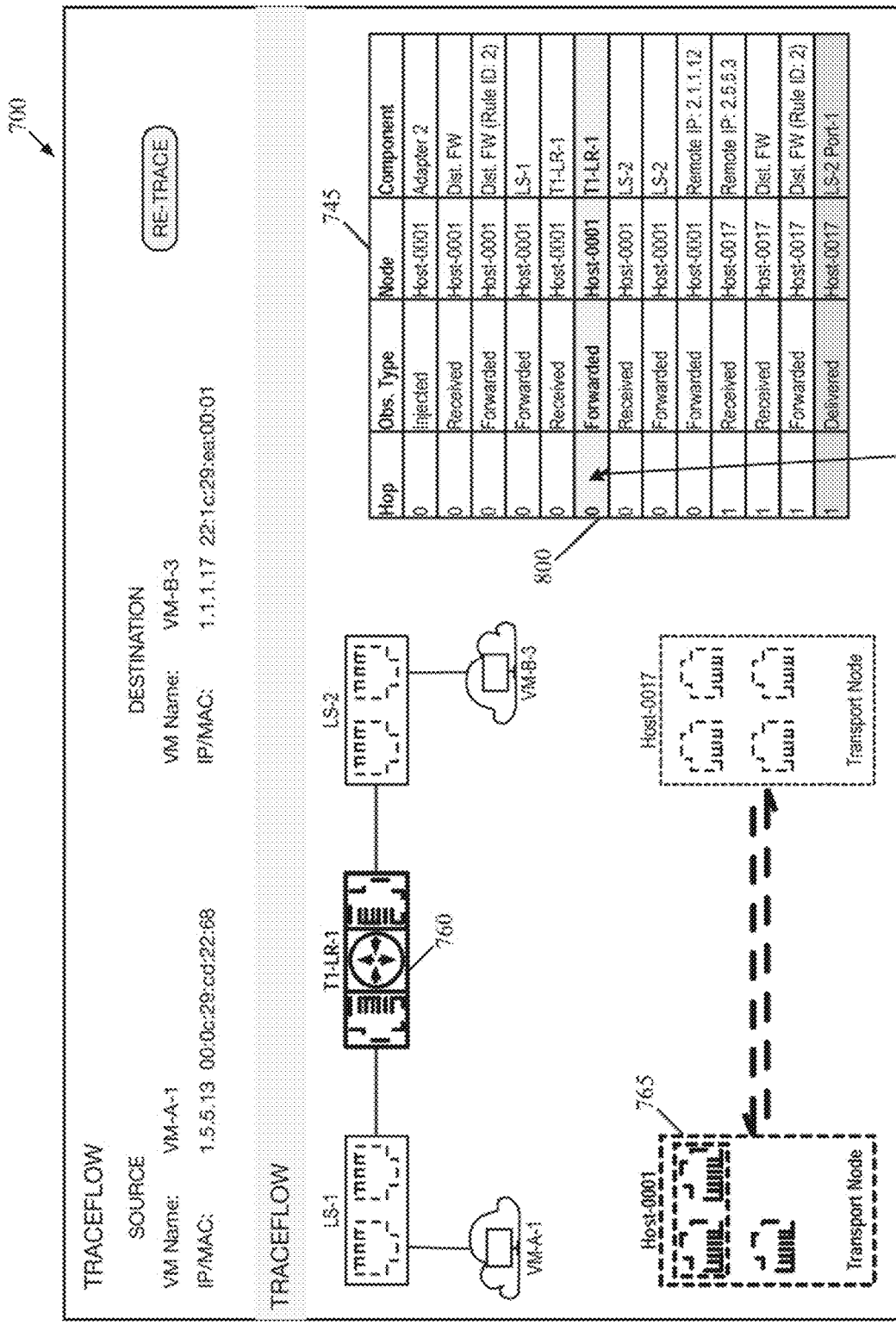
FIG. 8 illustrates an example of a user selecting a particular row in a table, with the GUI highlighting the corresponding logical and physical components in response.

FIG. 8 illustrates an example of a user selecting a particular row in the table 745, with the GUI 700 highlighting the corresponding logical and physical components in response. As shown, the user moves a cursor 805 over a row 800 in the packet tracing operation message table. This row 800 corresponds to a message indicating that the MFE in the first host 765 (Host-0001) performed logical forwarding of the trace packet for the logical router 760 (T1-LR-1). The user may select this row by moving the cursor over the row or providing other input (clicking on the row, using keyboard input, touch input, etc.) in different embodiments. As a result, the GUI 700 highlights the representation of the physical component that performed the operation (the host 765) and the logical component to which the operation relates (the logical router 760). Some embodiments either brighten (e.g., by increasing the saturation of) the highlighted components, lighten (e.g., by decreasing the saturation of) the other components, perform both, or otherwise highlight the components.

Figure 9:
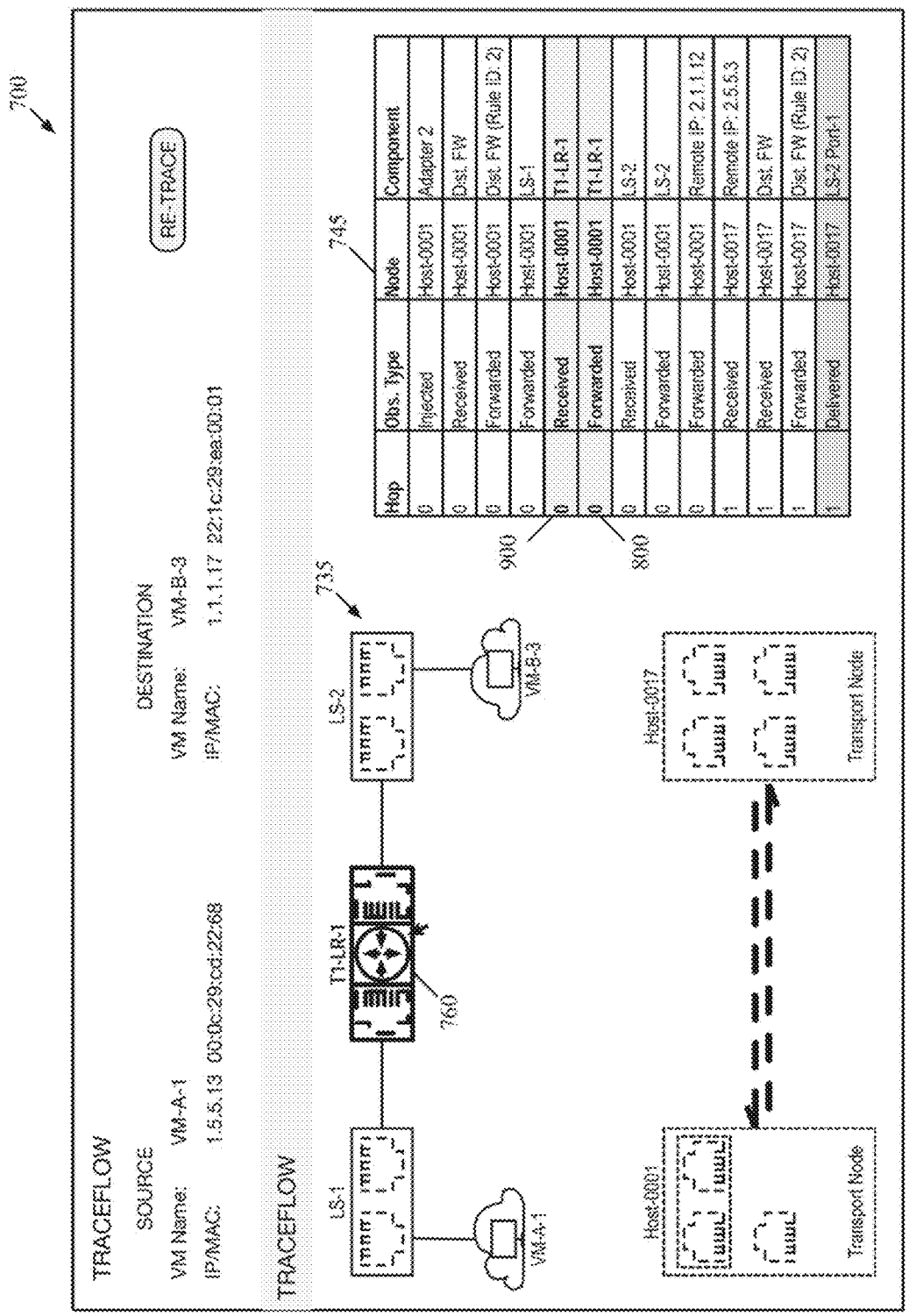
FIG. 9 illustrates an example of a user selecting a logical component in the logical path visualization, with the GUI highlighting the messages in the table that correspond to that component.

In addition to selecting a row in the table to see the related components, a user can select a component (logical or physical) to cause the GUI to highlight all of the related rows in the table. FIG. 9 illustrates an example of a user selecting a logical component in the logical path visualization 735, with the GUI 700 highlighting the messages in the table 745 that correspond to that component. As shown, the user moves the cursor 805 over the representation of the logical router 760. As in the previous example, the user may select this component by moving the cursor over the component or providing other input (clicking on the row, using keyboard input, touch input, etc.) in different embodiments. As a result, the GUI 700 highlights the representation of the component 760, as well as any rows in the table 745 for messages that relate to this component. In this case, two messages relate to the logical router 760; as such, the messages 900 and 800, relating to the logical receipt and forwarding of the packet for the logical router, are highlighted. In addition, though not shown in this example, some embodiments highlight the physical component (or multiple components) that implement the selected logical component for the path.

Figure 10:
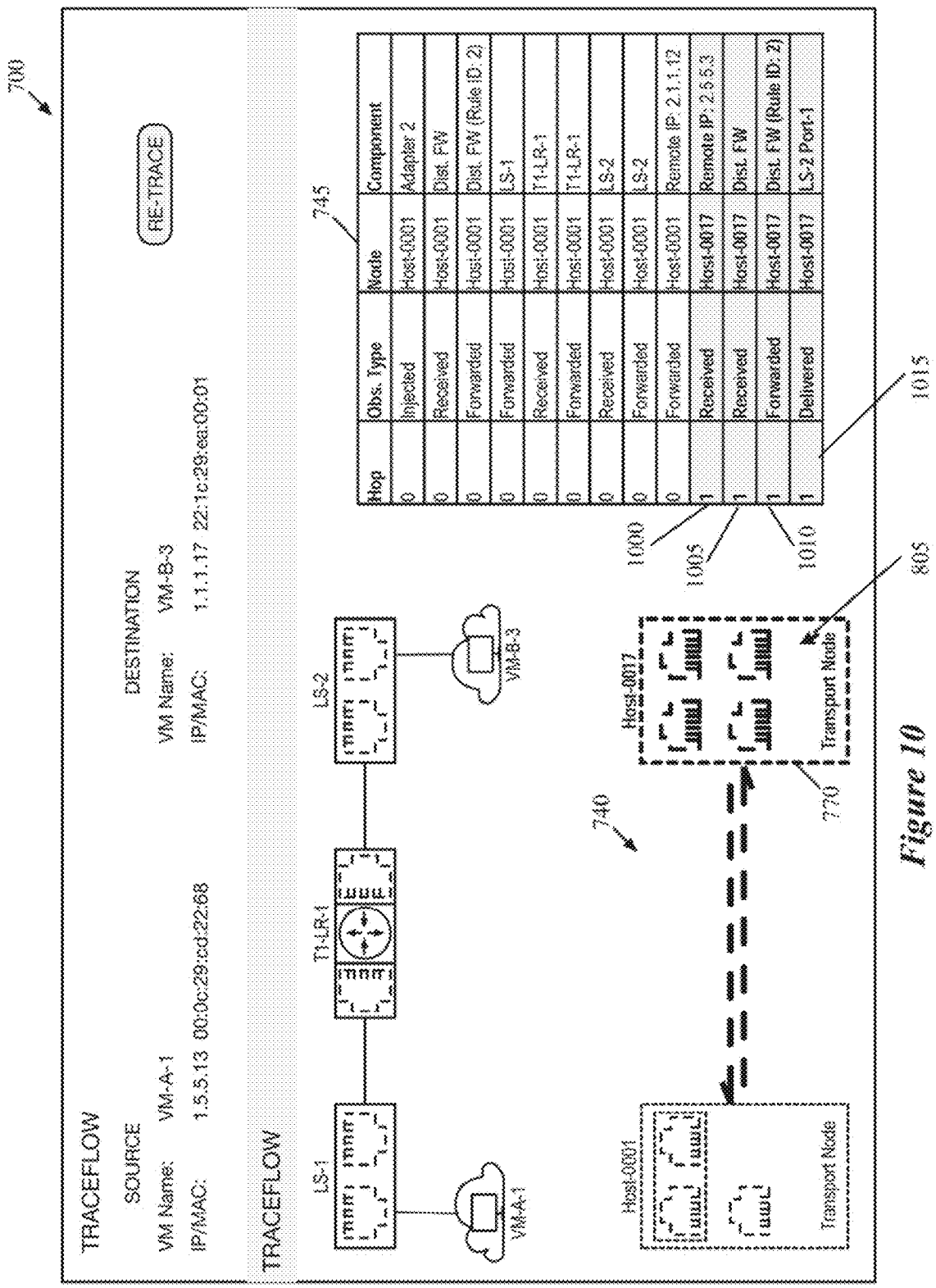
FIG. 10 illustrates an example of a user selecting a physical component in the physical path visualization, with the GUI highlighting the messages in the table that correspond to the selected component.

FIG. 10 illustrates an example of a user selecting a physical component in the physical path visualization 740, with the GUI highlighting the messages in the table 745 that correspond to the selected component. As shown, the user moves the cursor 805 over the representation of the physical host machine 770. As in the previous example, the user may select this component by moving the cursor over the component or providing other input (clicking on the row, using keyboard input, touch input, etc.) in different embodiments. As a result, the GUI highlights the representation of this physical component 770, as well as any rows in the table 745 for messages generated by this component. In this case, four messages relate to the physical host 770; as such, the messages 1000-1015 are highlighted. In addition, though not shown in this example, some embodiments highlight the logical component (or multiple components) that are implement by the selected physical component for the path taken by the trace packets.

Figure 11:
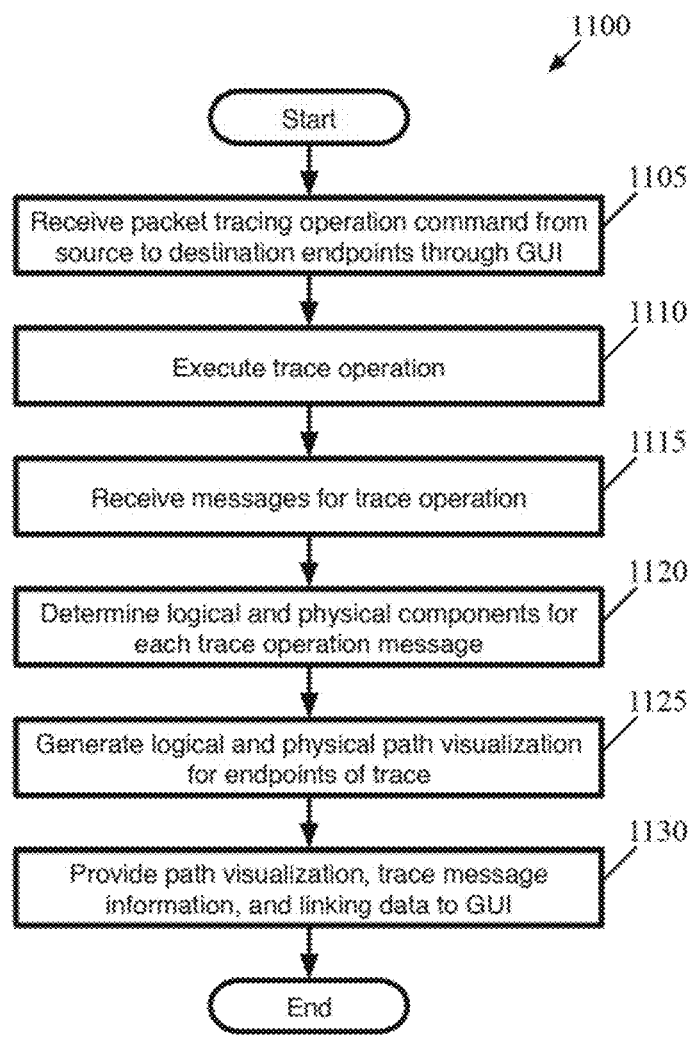
FIG. 11 conceptually illustrates a process of some embodiments for initiating a packet tracing operation and displaying the results of this operation along with a visualization of the logical and physical network paths taken by the trace packets.

FIG. 11 conceptually illustrates a process 1100 of some embodiments for initiating a packet tracing operation and displaying the results of this operation along with a visualization of the logical and physical network paths taken by the trace packets. This process 1100 is performed, in some embodiments, by a network management application that is integrated with a network control and management system for managing the implementation of logical networks within a physical network (e.g., a datacenter). In some embodiments, the network management application operates on a user device (e.g., an administrator computer) and queries the network control system for data. In other embodiments, the network management application operates on back-end devices (e.g., a cluster of computers on which the management and control system operates), and the administrator remotely accesses the application (e.g., through a web browser).

As shown, the process 1100 begins by receiving (at 1105) a command through a GUI for a packet tracing operation from a source endpoint to a destination endpoint (e.g., a pair of logical network endpoints. In some embodiments, the user specifies two logical switch ports (on the same or different logical switches), or a logical switch port and a logical router uplink for communicating with external networks (which may also be a logical network endpoint). In other embodiments, the user specifies a particular data compute node (e.g., a VM) or data compute node interface (e.g., a particular VIF of a VM) for each endpoint, as shown in FIG. 7.

The process 1100 then executes (at 1110) the trace operation. In some embodiments, the process that interacts with the GUI actually initiates the trace operation by sending a command to the network management and control system to generate and inject a trace packet at the source endpoint. The network management and control system (e.g., a combination of network managers, central controllers, and local controllers operating on the host machines) generates a trace packet, and injects this packet at the MFE operating on the host machine of the source endpoint.

Next, the process 1100 receives (at 1115) messages for the trace operation (i.e., the forwarding, receipt, delivery, etc. messages pertaining to various different components). Again, in some embodiments, the network management and control system receives these messages from the MFEs, and provides them to the GUI process.

The process 1100 determines (at 1120) the logical and physical components for each trace operation message. That is, for each trace operation message received, the process determines (i) the physical component that generated the message and (ii) the logical component to which the message relates (or other information about the message, for non-logical information such as tunnel send and receive messages). In the table 745, this is the information in the node and component columns.

The process 1100 also generates (at 1125) the logical and physical path visualizations for the trace operation endpoints. In some embodiments, the process 1100 uses the process 600, or portions thereof, in order to generate the path visualizations. That is, the process determines the logical network components and interfaces between the endpoints and the physical network components along the packet path and their physical interfaces, then determines the alignment of these two sets of components.

Finally, the process 1100 provides (at 1130) the (logical and physical) path visualization (including the alignment information), the trace message data, and the linking information (between the trace messages and the path visualization) to the GUI. In some embodiments, this information is provided as a set of data structures, which the application converts to a graphical visualization of the paths (e.g., using SVG images) and a table of the messages. In other embodiments (e.g., when the GUI is provided on a web browser), the aligned graphical data and the table itself is provided. After providing the data, the process 1100 ends.

Figure 12:
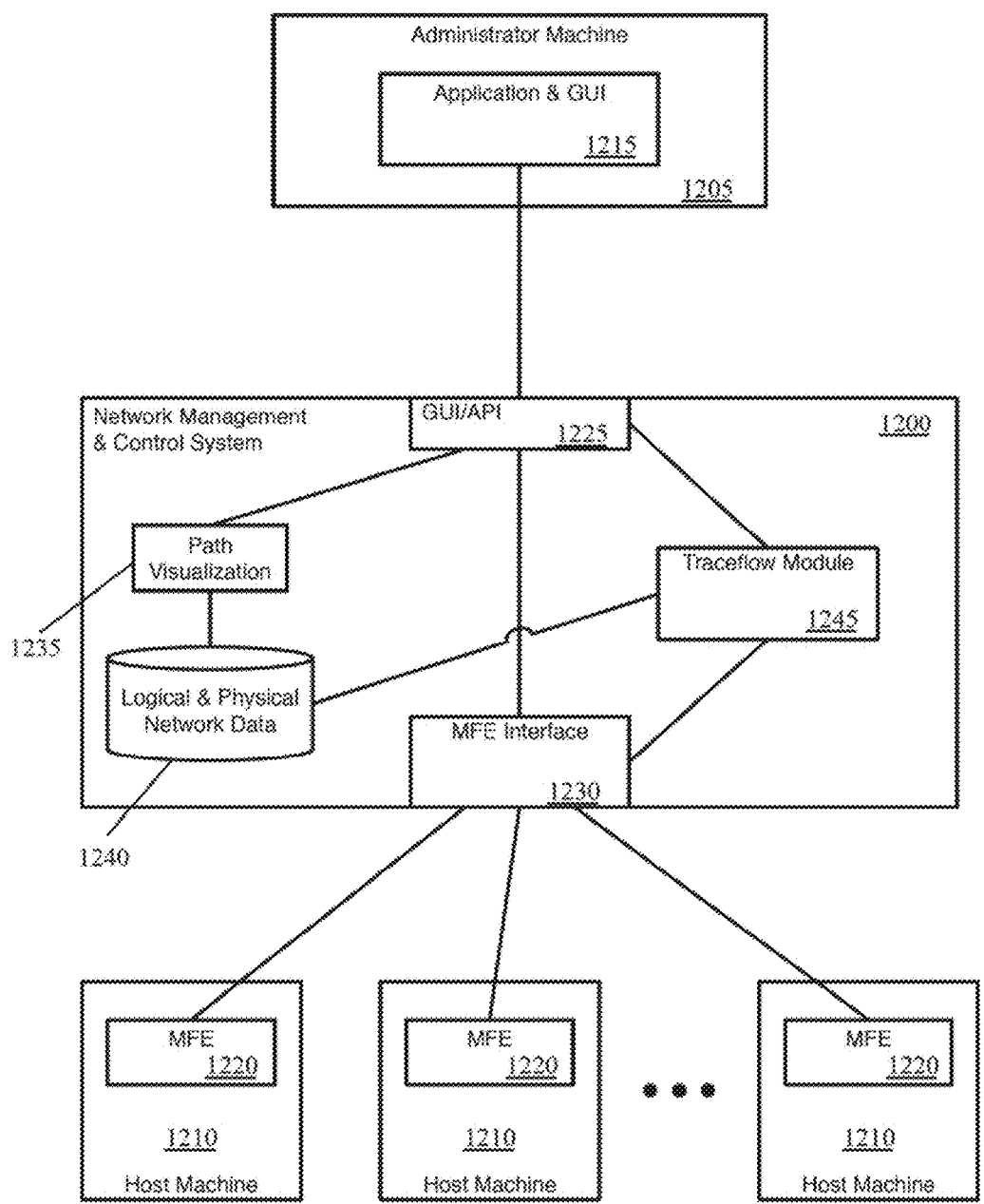
FIG. 12 conceptually illustrates the architecture of a network management and control system that generates the GUI of some embodiments for displaying network path visualizations and trace operation results.

FIG. 12 conceptually illustrates the architecture of a network management and control system 1200 that generates the GUI of some embodiments for displaying network path visualizations and trace operation results. In addition, the figure illustrates and administrator machine 1205. (separate from the management and control system 1200) as well as several host machines 1210.

The administrator machine 1205, of some embodiments, may be a desktop or laptop computer, or other device, that an administrator uses to connect with the network management and control system 1200. This machine 1205 runs an application 1215 that presents the GUI (i.e., the management application GUI, as shown in the above figures) to the administrator. This application 1215 operating on the administrator machine may be a management application that links with the network management and control system 1200 in some embodiments. In some such embodiments, the application 1215 receives data describing the trace operation results and/or the logical and physical network paths, and uses its stored graphics and information to convert this data into the GUI. In other embodiments, the application 1215 is a web browser or other generic application through which the administrator machine connects to the network management and control system 1200 (e.g., as a thin client). In some such embodiments, the application 1215 receives a description of the GUI itself as well as the graphics to display from the network management and control system 1200 (i.e., the network management and control system generates the GUI and provides this to the application).

The host machines 1210 may host logical network data compute nodes (e.g., VMs, containers, etc.) and/or centralized routing components for logical routers (e.g., as VMs, within the MFE datapath, etc.). Each of the host machines 1210 includes a MFE 1220. In some embodiments, the MFEs 1220 are software forwarding elements (e.g., OVS, ESX) that may be part of the virtualization software of the host machine. The MFEs implement logical networks within the physical network of, e.g., a datacenter, and receive configuration data for these logical networks from the network management and control system 1200. In addition, when a packet tracing operation is requested, the network management and control system 1200 injects a packet into the MFE 1220 on the host machine of the source endpoint for the trace. The MFEs 1220 that process the trace packet send observation messages to the network management and control system 1200 to indicate the actions taken on the trace packet.

The network management and control system 1200, as shown includes a GUI/API 1225, an interface 1230 for communicating with the MFEs, a storage 1235 that stores logical and physical network data, a path visualizer 1240, and a traceflow module 1245. While a single block is shown to represent the network management and control system 1200, it should be understood that these functions may be spread among multiple different computing devices and/or separately functioning applications on a single computing device. For instance, in some embodiments the network management and control system 1200 includes a centralized management plane and centralized control plane in addition to local controllers that operate on the host machines 1210 to directly control the MFEs. In addition, the centralized aspects may be performed in a distributed cluster in some embodiments.

The GUI/API 1225 is the interface through which the application 1215 on the administrator machine communicates with the network management and control system 1200. The application 1215 sends various commands (e.g., to initiate a traceflow operation and provide results, to display the path visualization between a set of endpoints) via this interface 1225. The network management and control system 1200 provides the GUI and/or data for the GUI to the application 1215 to the application through this interface 1225.

The MFE interface 1230 is representative of the interface(s) through which the network management and control system 1200 configures the MFEs 1220. In some embodiments, centralized controllers (operating on separate machines from the MFEs 1220) provide configuration data directly to the MFEs. In other embodiments, however, the centralized network management and control system 1200 provides abstract configuration data to local controllers that operate alongside the MFEs 1220 on the host machines 1210; these local controllers then convert this data into MFE-specific configuration data and provide the data to the MFEs. Through whichever mechanism is implemented, the network management and control system 1200 injects trace packets into the appropriate source MFE 1220, and receives observation messages based on the processing of this trace packet from the MFEs 1220.

The logical and physical network data storage 1235 stores information about the configuration of various logical networks implemented within the physical networks (i.e., implemented by the MFEs 1220). This includes the configuration of logical forwarding elements and their ports, distributed firewall rules, etc. In addition, the storage 1235 stores information about the physical network implementation of these logical networks, including the host machines on which the various logical ports (i.e., logical network endpoints, such as VMs) are located. This information may be stored in a single central repository, replicated among multiple repositories in a cluster, and/or stored in a distributed manner.

The path visualizer 1240 uses the logical and physical network data 1235 to generate the logical and physical network path visualization between a set of endpoints, upon request from an application 1215 through the interface 1225. The path visualizer 1240, in some embodiments, performs the process 600 or a similar process. The path visualizer 1240 generates the logical and physical paths, determines the relevant interfaces (both logical and physical) to display, aligns the two paths for display, and provides this visualization (along with the other information about the components) to the interface 1225.

The traceflow module 1245 receives a packet tracing request through the interface 1245 and initiates the packet tracing operation. In some embodiments, various aspects of the packet tracing operation are performed by different layers of the network management and control system 1200. For instance, in some embodiments the management plane initiates the process, while the local controllers actually inject the packet (according to data received from the management plane or central control plane) and receive the observation messages from the MFEs 1220. The observation messages are then passed up to the centralized aspects, which analyze these messages. The traceflow module 1245 also generates a table to be included in the GUI, and provides this table to the application 1215 through the interface 1225.

III. Electronic System

Figure 13:
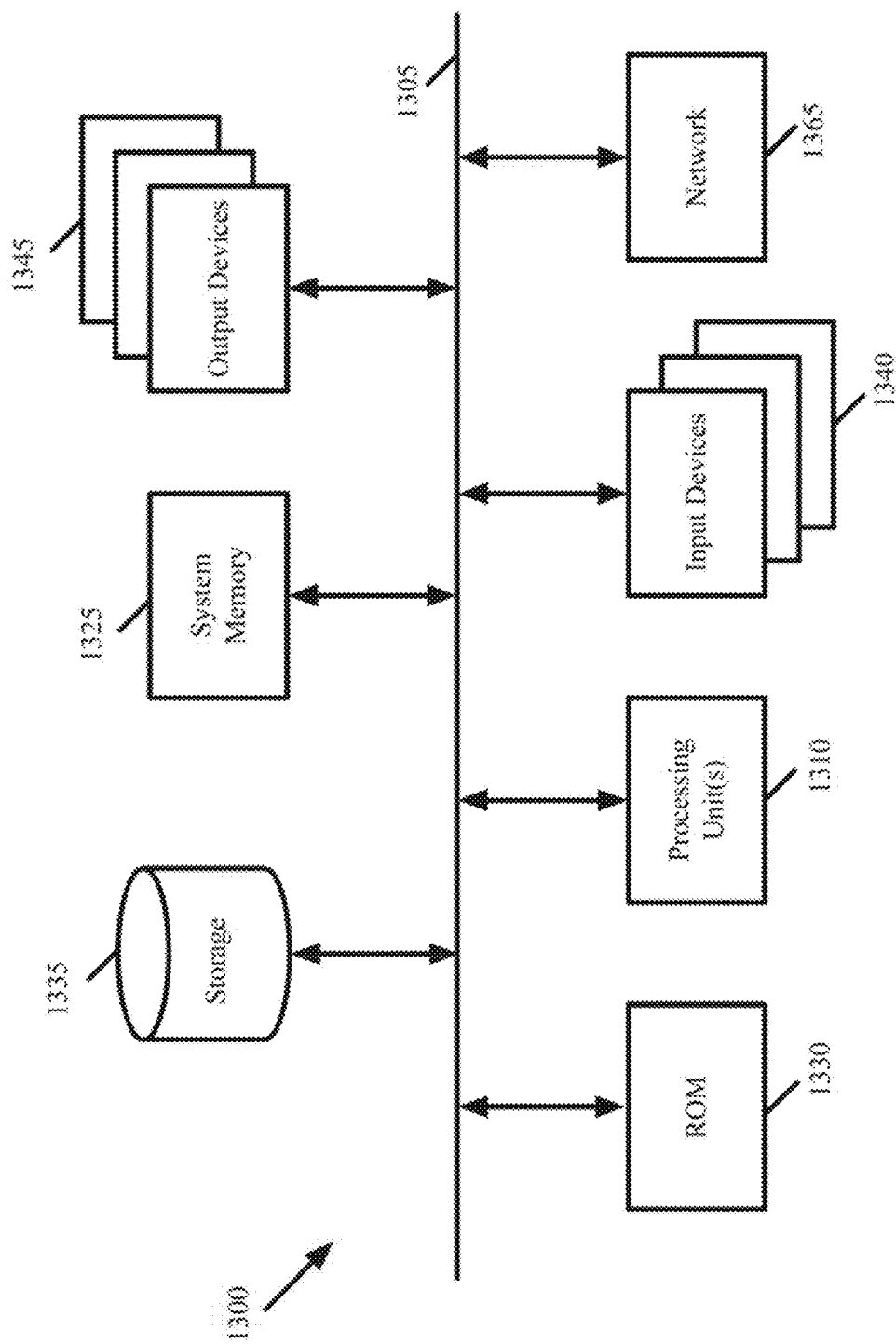
FIG. 13 conceptually illustrates an electronic system with which some embodiments of the invention are implemented.

FIG. 13 conceptually illustrates an electronic system 1300 with which some embodiments of the invention are implemented. The electronic system 1300 can be used to execute any of the control, virtualization, or operating system applications described above. The electronic system 1300 may be a computer e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1325, and the permanent storage device 1335.

From these various memory units, the processing unit(s) 1310 retrieve instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device. Like the permanent storage device 1335, the system memory 1325 is a read-and-write memory device. However, unlike storage device 1335, the system memory is a volatile read-and-write memory, such a random access memory. The system memory stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices enable the user to communicate information and select commands to the electronic system. The input devices 1340 include alphanumeric keyboards and pointing devices (also called "cursor control devices"). The output devices 1345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 13, bus 1305 also couples electronic system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Bin-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other, hand, are constructs that run on top of a host operating, system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 6 and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method comprising:
receiving data regarding a packet tracing operation between endpoints of a logical network;
generating a display comprising (i) a visualization of a path between the endpoints of the logical network and (ii) a representation of the received data regarding the packet tracing operation, wherein the path visualization comprises a set of components and the representation of the packet tracing operation data is visually linked to the components of the path.

2. The method of claim 1, wherein the received packet tracing operation data comprises a set of messages generated by physical network components located between the endpoints.

3. The method of claim 2, wherein the received messages identify actions taken to process a tracing packet sent from a first endpoint to the second endpoint.

4. The method of claim 3, wherein the actions identified by the received messages comprise at least one of receipt of the tracing packet for a logical network component, logical forwarding according to a logical network component, application of a distributed firewall rule, physical forwarding by the physical network component from which the message is received, dropping the tracing packet, and delivery of the tracing packet to an endpoint.

5. The method of claim 2, wherein the display of the representation of the received data comprises a list of the received messages, wherein the representation of each message identifies a type of message and the physical network component that generated the message.

6. The method of claim 5, wherein the representation of each of a subset of the messages further identifies a logical network component to which the message relates.

7. The method of claim 1, wherein selection of a particular data item in the packet tracing operation data representation causes highlighting in the path visualization of a set of network components to which the particular data item relates.

8. The method of claim 7, wherein the set of network components to which the particular data item relates comprises (i) a physical network component that generated the particular data item and (ii) a logical network component to which the particular data item relates.

9. The method of claim 8, wherein the physical network component comprises a physical host machine with a forwarding element that implements the logical network component.

10. The method of claim 1, wherein selection of a particular component in the path visualization causes highlighting in the packet tracing operation data representation of a set of data items related to the particular component.

11. The method of claim 10, wherein the particular component is one of (i) a logical network component to which the set of data items relate and (ii) a physical network component that generated the set of data items.

12. The method of claim 1, wherein the path visualization comprises (i) a set of logical network components between the endpoints and (ii) a set of physical network components that implement the logical network components for packets sent between the endpoints.

13. The method of claim 12, wherein the physical network components and the network components are aligned in the display.

14. A non-transitory machine readable medium storing a program for execution by at least one processing unit, the program comprising sets of instructions for:
receiving data regarding a packet tracing operation between endpoints of a logical network;
generating a display comprising (i) a visualization of a path between the endpoints of the logical network and (ii) a representation of the received data regarding the packet tracing operation, wherein the path visualization comprises a set of components and the representation of the packet tracing operation data is visually linked to the components of the path.

15. The non-transitory machine readable medium of claim 14, wherein the received packet tracing operation data comprises a set of messages generated by physical network components located between the endpoints.

16. The non-transitory machine readable medium of claim 15, wherein the received messages identify actions taken to process a tracing packet sent from a first endpoint to the second endpoint, wherein the actions identified by the received messages comprise at least one of receipt of the tracing packet for a logical network component, logical forwarding according to a logical network component, application of a distributed firewall rule, physical forwarding by the physical network component from which the message is received, dropping the tracing packet, delivery of the tracing packet to an endpoint.

17. The non-transitory machine readable medium of claim 15, wherein the display of the representation of the received data comprises a list of the received messages, wherein the representation of each message identifies a type of message and the physical network component that generated the message.

18. The non-transitory machine readable medium of claim 17, wherein the representation of each of a subset of the messages further identifies a logical network component to which the message relates.

19. The non-transitory machine readable medium of claim 14, wherein selection of a particular data item in the packet tracing operation data representation causes highlighting in the path visualization of a set of network components to which the particular data item relates.

20. The non-transitory machine readable medium of claim 19, wherein the set of network components to which the particular data item relates comprises (i) a physical network component that generated the particular data item and (ii) a logical network component to which the particular data item relates.

21. The non-transitory machine readable medium of claim 14, wherein selection of a particular component in the path visualization causes highlighting in the packet tracing operation data representation of a set of data items related to the particular component, wherein the particular component is one of (i) a logical network component to which the set of data items relate and (ii) a physical network component that generated the set of data items.

22. The non-transitory machine readable medium of claim 14, wherein the path visualization comprises (i) a set of logical network components between the endpoints and (ii) a set of physical network components that implement the logical network components for packets sent between the endpoints, wherein the physical network components and the logical network components are aligned in the display.

* * * * *